US012324460B2

(12) United States Patent
Bless et al.

(10) Patent No.: US 12,324,460 B2
(45) **Date of Patent: *Jun. 10, 2025**

(54) ELECTRONIC SMOKING ARTICLE INCLUDING A HEATING APPARATUS IMPLEMENTING A SOLID AEROSOL GENERATING SOURCE

(71) Applicant: RAI Strategic Holdings, Inc., Winston-Salem, NC (US)

(72) Inventors: Alfred Charles Bless, Asheboro, NC (US); Michael Andrew Liberti, Clemmons, NC (US); Stephen Benson Sears, Siler City, NC (US)

(73) Assignee: RAI Strategic Holdings, Inc., Winston-Salem, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/486,925

(22) Filed: Oct. 13, 2023

(65) Prior Publication Data

US 2024/0041115 A1 Feb. 8, 2024

Related U.S. Application Data

(63) Continuation of application No. 17/355,983, filed on Jun. 23, 2021, now Pat. No. 11,819,060, which is a (Continued)

(51) Int. Cl.
*A24F 40/46* (2020.01)
*A24F 40/40* (2020.01)
(Continued)

(52) U.S. Cl.
CPC .............. *A24F 40/46* (2020.01); *A24F 40/40* (2020.01); *A24F 40/53* (2020.01); *A24F 40/70* (2020.01); *H05B 1/0244* (2013.01); *A24F 40/20* (2020.01)

(58) Field of Classification Search
None
See application file for complete search history.

(56) References Cited

U.S. PATENT DOCUMENTS

| | | | |
|---|---|---|---|
| 4,340,072 | A | 7/1982 | Bolt et al. |
| 4,449,541 | A | 5/1984 | Mays et al. |

(Continued)

FOREIGN PATENT DOCUMENTS

| | | | |
|---|---|---|---|
| CN | 201085044 | Y | 7/2008 |
| CN | 201750712 | U | 2/2011 |

(Continued)

OTHER PUBLICATIONS

Depiano et al., "Atomizer for an Aerosol Delivery Device and Related Input, Aerosol Production Assembly, Cartridge, and Method," U.S. Appl. No. 14/194,233, filed Feb. 28, 2014, 83 pages.

(Continued)

*Primary Examiner* — Cynthia Szewczyk
(74) *Attorney, Agent, or Firm* — Womble Bond Dickinson (US) LLP; Chris Humphrey; John V. Forcier

(57) ABSTRACT

A smoking article is provided, having a component housing including a power source, and a tubular housing having a first end and a longitudinally-opposed second end, wherein the first or second end is configured to receive the component housing. The tubular housing includes an outer wall defining a cylindrical cavity. An aerosol-generating element is configured to be received within the cylindrical cavity, wherein the aerosol-generating element is configured to produce an aerosol in response to heat. An associated aerosol-generating element and related production methods are also provided.

33 Claims, 14 Drawing Sheets

Related U.S. Application Data continuation of application No. 16/839,767, filed on Apr. 3, 2020, now Pat. No. 11,071,325, which is a continuation of application No. 16/262,157, filed on Jan. 30, 2019, now Pat. No. 10,645,976, which is a continuation of application No. 14/734,421, filed on Jun. 9, 2015, now Pat. No. 10,226,073.

(51) Int. Cl.

| | |
|---|---|
| ***A24F 40/53*** | (2020.01) |
| ***A24F 40/70*** | (2020.01) |
| ***H05B 1/02*** | (2006.01) |
| *A24F 40/20* | (2020.01) |

(56) References Cited

U.S. PATENT DOCUMENTS

| | | | |
|---|---|---|---|
| 4,735,217 | A | 4/1988 | Gerth et al. |
| 4,793,365 | A | 12/1988 | Sensabaugh, Jr. et al. |
| 4,889,143 | A | 12/1989 | Pryor et al. |
| 4,922,901 | A | 5/1990 | Brooks et al. |
| 4,924,887 | A | 5/1990 | Raker et al. |
| 4,924,888 | A | 5/1990 | Perfetti et al. |
| 4,947,874 | A | 8/1990 | Brooks et al. |
| 4,947,875 | A | 8/1990 | Brooks et al. |
| 4,972,855 | A | 11/1990 | Kuriyama et al. |
| 5,025,814 | A | 6/1991 | Raker |
| 5,060,671 | A | 10/1991 | Counts et al. |
| 5,060,676 | A | 10/1991 | Hearn et al. |
| 5,065,537 | A | 11/1991 | Bailey |
| 5,093,894 | A | 3/1992 | Deevi et al. |
| 5,101,839 | A | 4/1992 | Jakob et al. |
| 5,105,831 | A | 4/1992 | Banerjee et al. |
| 5,144,962 | A | 9/1992 | Counts et al. |
| 5,159,942 | A | 11/1992 | Brinkley et al. |
| 5,224,498 | A | 7/1993 | Deevi et al. |
| 5,228,460 | A | 7/1993 | Sprinkel et al. |
| 5,249,586 | A | 10/1993 | Morgan et al. |
| 5,261,424 | A | 11/1993 | Sprinkel, Jr. |
| 5,322,075 | A | 6/1994 | Deevi et al. |
| 5,353,813 | A | 10/1994 | Deevi et al. |
| 5,372,148 | A | 12/1994 | McCafferty et al. |
| 5,468,936 | A | 11/1995 | Deevi et al. |
| 5,498,850 | A | 3/1996 | Das |
| 5,498,855 | A | 3/1996 | Deevi et al. |
| 5,530,225 | A | 6/1996 | Hajaligol |
| 5,573,692 | A | 11/1996 | Das et al. |
| 5,591,368 | A | 1/1997 | Fleischhauer et al. |
| 5,659,656 | A | 8/1997 | Das |
| 5,665,262 | A | 9/1997 | Hajaligol et al. |
| 5,666,977 | A | 9/1997 | Higgins et al. |
| 5,934,289 | A | 8/1999 | Watkins et al. |
| 5,954,979 | A | 9/1999 | Counts et al. |
| 5,967,148 | A | 10/1999 | Harris et al. |
| 6,040,560 | A | 3/2000 | Fleischhauer et al. |
| 6,053,176 | A | 4/2000 | Adams et al. |
| 6,164,287 | A | 12/2000 | White |
| 6,196,218 | B1 | 3/2001 | Voges |
| 6,772,756 | B2 | 8/2004 | Shayan |
| 6,803,545 | B2 | 10/2004 | Blake et al. |
| 6,810,883 | B2 | 11/2004 | Felter et al. |
| 6,854,461 | B2 | 2/2005 | Nichols et al. |
| 7,040,314 | B2 | 5/2006 | Nguyen et al. |
| 7,290,549 | B2 | 11/2007 | Banerjee et al. |
| 7,647,932 | B2 | 1/2010 | Cantrell et al. |
| 7,762,320 | B2 | 7/2010 | Williams |
| 7,832,410 | B2 | 11/2010 | Hon |
| 8,079,371 | B2 | 12/2011 | Robinson et al. |
| 8,156,944 | B2 | 4/2012 | Han |
| 8,186,360 | B2 | 5/2012 | Marshall et al. |
| 8,375,957 | B2 | 2/2013 | Hon |
| 8,402,976 | B2 | 3/2013 | Fernando et al. |
| 8,464,726 | B2 | 6/2013 | Sebastian et al. |
| 8,689,804 | B2 | 4/2014 | Fernando et al. |
| 8,794,231 | B2 | 8/2014 | Thorens et al. |
| 8,851,083 | B2 | 10/2014 | Oglesby et al. |
| 8,915,254 | B2 | 12/2014 | Monsees et al. |
| 8,925,555 | B2 | 1/2015 | Monsees et al. |
| 2004/0255965 | A1 | 12/2004 | Perfetti et al. |
| 2006/0196518 | A1 | 9/2006 | Hon |
| 2007/0102013 | A1 | 5/2007 | Adams et al. |
| 2007/0102103 | A1 | 5/2007 | Ku |
| 2007/0215167 | A1 | 9/2007 | Llewellyn Crooks et al. |
| 2009/0188490 | A1 | 7/2009 | Han |
| 2010/0024834 | A1 | 2/2010 | Oglesby et al. |
| 2010/0307518 | A1 | 12/2010 | Wang |
| 2012/0042885 | A1 | 2/2012 | Stone et al. |
| 2013/0255702 | A1 | 10/2013 | Griffith, Jr. et al. |
| 2014/0096781 | A1 | 4/2014 | Sears et al. |
| 2014/0190478 | A1 | 7/2014 | Liu |
| 2014/0261408 | A1 | 9/2014 | DePiano et al. |
| 2014/0261491 | A1 | 9/2014 | Hawes |
| 2014/0266898 | A1 | 9/2014 | Linnenbrink |
| 2014/0270726 | A1 * | 9/2014 | Egoyants ................ H05B 3/44 392/386 |
| 2014/0299139 | A1 | 10/2014 | Liu |
| 2014/0305449 | A1 | 10/2014 | Plojoux et al. |
| 2015/0150305 | A1 | 6/2015 | Shenkal |
| 2015/0157052 | A1 | 6/2015 | Ademe et al. |
| 2015/0216232 | A1 | 8/2015 | Bless et al. |
| 2015/0245659 | A1 | 9/2015 | DePiano et al. |
| 2015/0335070 | A1 | 11/2015 | Sears et al. |
| 2016/0366937 | A1 | 12/2016 | Liu |

FOREIGN PATENT DOCUMENTS

| | | | | |
|---|---|---|---|---|
| CN | 102869403 | A | 1/2013 | |
| CN | 203523811 | U | 4/2014 | |
| CN | 203860448 | U | 10/2014 | |
| CN | 204120229 | U | 1/2015 | |
| DE | 19854005 | A1 | 5/2000 | |
| DE | 202014001718 | U1 | 5/2015 | |
| JP | H03112477 | A | 5/1991 | |
| JP | H03232481 | A | 10/1991 | |
| JP | H05329213 | A | 12/1993 | |
| KR | 100636287 | B1 | 10/2006 | |
| KR | 20110084388 | A | 7/2011 | |
| WO | WO-1998057556 | A1 | 12/1998 | |
| WO | WO-2010092593 | A1 | 8/2010 | |
| WO | WO-2013003485 | A1 | 1/2013 | |
| WO | WO-2013022936 | A1 | 2/2013 | |
| WO | WO-2013060743 | A2 | 5/2013 | |
| WO | WO-2013083631 | A1 | 6/2013 | |
| WO | WO-2013098398 | A2 * | 7/2013 | ........... A24B 15/167 |
| WO | WO-2013098410 | A2 | 7/2013 | |
| WO | WO-2013116558 | A1 * | 8/2013 | ........... A24B 15/167 |
| WO | WO-2013149404 | A1 | 10/2013 | |
| WO | WO-2013160112 | A2 | 10/2013 | |
| WO | WO-2014012906 | A1 | 1/2014 | |
| WO | WO-2014058678 | A1 | 4/2014 | |
| WO | WO-2014110119 | A1 | 7/2014 | |
| WO | WO-2014132045 | A2 | 9/2014 | |
| WO | WO-2014138244 | A1 | 9/2014 | |
| WO | WO-2015071682 | A1 | 5/2015 | |
| WO | WO-2015177044 | A1 | 11/2015 | |

OTHER PUBLICATIONS

Sears, et al., "Electrically Powered Aerosol Delivery System," U.S. Appl. No. 14/282,768, filed May 20, 2014, 40 pages.

EPO, Summons to Attend Oral Proceedings for EP Application No. 16731440.0, dated Oct. 10, 2024, p. 1-25.

* cited by examiner

ELECTRONIC SMOKING ARTICLE INCLUDING A HEATING APPARATUS IMPLEMENTING A SOLID AEROSOL GENERATING SOURCE

CROSS-REFERENCE TO RELATED APPLICATIONS

This application is a continuation of U.S. application Ser. No. 17/355,983, filed Jun. 23, 2021, which is a continuation of U.S. application Ser. No. 16/839,737, filed Apr. 2, 2020, now U.S. Pat. No. 11,071,325, which is a continuation of U.S. application Ser. No. 16,262,157, filed Jan. 30, 2019, now U.S. Pat. No. 10,645,976, which is a continuation of U.S. application Ser. No. 14,734,421, filed Jun. 9, 2015, now U.S. Pat. No. 10,226,073, the entire disclosures of which are hereby incorporated by reference herein in their entireties.

BACKGROUND

Field of the Disclosure

The present disclosure relates to aerosol delivery devices and systems, such as smoking articles; and more particularly, to aerosol delivery devices and systems that utilize electrically-generated heat for the production of aerosol (e.g., smoking articles for purposes of yielding components of tobacco and other materials in an inhalable form, commonly referred to as electronic cigarettes). Highly preferred components of such articles are made or derived from tobacco, or those articles can be characterized as otherwise incorporating tobacco for human consumption, and which are capable of vaporizing components of tobacco and/or other tobacco related materials to form an inhalable aerosol for human consumption.

Description of Related Art

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al.; and U.S. Pat. App. Pub. Nos. 2013/0255702 to Griffith, Jr. et al.; and 2014/0096781 to Sears et al., which are incorporated herein by reference. See also, for example, the various types of smoking articles, aerosol delivery devices and electrically powered heat generating sources referenced by brand name and commercial source in U.S. patent application Ser. No. 14/170,838, filed Feb. 3, 2014, to Bless et al., which is incorporated herein by reference. Additional types of smoking articles, aerosol delivery devices and electrically powered heat generating sources referenced by brand name and commercial source are listed in U.S. patent application Ser. No. 14/194,233, filed Feb. 28, 2014, to DePiano et al., which is also incorporated herein by reference in its entirety.

Certain tobacco products that have employed electrical energy to produce heat for aerosol formation, and in particular, certain products that have been referred to as electronic cigarette products, have been commercially available throughout the world. Representative products that resemble many of the attributes of traditional types of cigarettes, cigars or pipes have been marketed as ACCORD® by Philip Morris Incorporated; ALPHA™, JOYE 510™ and M4™ by InnoVapor LLC; CIRRUS™ and FLING™ by White Cloud Cigarettes; BLU™ by Lorillard Technologies, Inc.; COHITA™, COLIBRI™, ELITE CLASSIC™, MAGNUM™ PHANTOM™ and SENSE™ by Epuffer® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; FIN™ by FIN Branding Group, LLC; SMOKE® by Green Smoke Inc. USA; GREENARETTE™ by Greenarette LLC; HALLIGAN™, HENDU™, JET™, MAXXQ™, PINK™ and PITBULL™ by Smoke Stik®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SF® by Smoker Friendly International, LLC; GREEN SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC; VUSE® by R. J. Reynolds Vapor Company; Mistic Menthol product by Mistic Ecigs; and the Vype product by CN Creative Ltd. Yet other electrically powered aerosol delivery devices, and in particular those devices that have been characterized as so-called electronic cigarettes, have been marketed under the tradenames COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP®; SOUTH BEACH SMOKE™.

It would be desirable to provide a smoking article that employs heat produced by electrical energy to provide the sensations of cigarette, cigar, or pipe smoking, that does so without combusting tobacco to any significant degree, that does so without the need of a combustion heat source, and that does so without necessarily delivering considerable quantities of incomplete combustion and pyrolysis products. It would also be desirable to provide a smoking article that provides substantially even distribution of heat to a solid aerosol-generating source without combusting the solid aerosol-generating material to any significant degree.

BRIEF SUMMARY OF THE DISCLOSURE

The present disclosure relates to aerosol delivery systems. Such systems have the ability to generate aerosol as a result of heat generated by electrical power sources, and to deliver aerosol that is intended to be drawn into the mouth of a user. Of particular interest are aerosol delivery systems that provide components of tobacco in an aerosol form, such as is provided to smokers by devices commonly known or characterized as electronic cigarettes. As used herein, the term "aerosol" is meant to include vapors, gases, aerosols, and/or particulate matter of a form or type suitable for human inhalation, whether visible or not, and whether or not of a form that might be considered to be "smoke-like."

The above and other needs are met by aspects of the present disclosure which, in one aspect, provides an electronic smoking article and/or an aerosol delivery system. Such a smoking article may include a component housing including a power source, and a tubular housing having a mouthpiece-engaging or first end and a longitudinally-opposed component-engaging or second end. The first or second end may be configured to receive the component housing. According to some aspects, the tubular housing may have an outer wall defining a cylindrical cavity. An aerosol-generating element may be configured to be received within the cylindrical cavity and may be configured to produce an aerosol in response to heat.

According to another aspect of the present disclosure, a method is provided for producing a smoking article. The method may include engaging a component housing including a power source with a first or second end of a tubular housing. The tubular housing may have a mouthpiece-engaging or first end that is longitudinally-opposed to the component-engaging or second end. In some aspects, the tubular housing may have an outer wall defining a laterally-extending cylindrical cavity. In some aspects, the method includes inserting an aerosol-generating element into the cylindrical cavity, wherein the aerosol-generating element may be configured to produce an aerosol in response to heat.

In another aspect, an aerosol-generating element for a smoking article is provided that includes a hollow cylinder extrudate of a tobacco-related material that is adapted to be received by a heating element extending about an outer surface and within an inner surface of the hollow cylinder extrudate, wherein the heating element generally defines a hollow cylindrical cavity for receiving the hollow cylinder extrudate, and wherein the hollow cylinder extrudate is responsive to heat provided by the heating element to produce an aerosol.

Still another aspect provides a method of producing an aerosol-generating element for a smoking article. The method may include extruding a tobacco-related material as a hollow cylinder adapted to be received by a heating element extending about an outer surface and within an inner surface of the hollow cylinder extrudate, wherein the heating element generally defines a hollow cylindrical cavity for receiving the hollow cylinder extrudate, and wherein the hollow cylinder is responsive to heat provided by the heating element to produce an aerosol.

These and other features, aspects, and advantages of the disclosure will be apparent from a reading of the following detailed description together with the accompanying drawings, which are briefly described below.

BRIEF DESCRIPTION OF THE DRAWINGS

Figure 1:
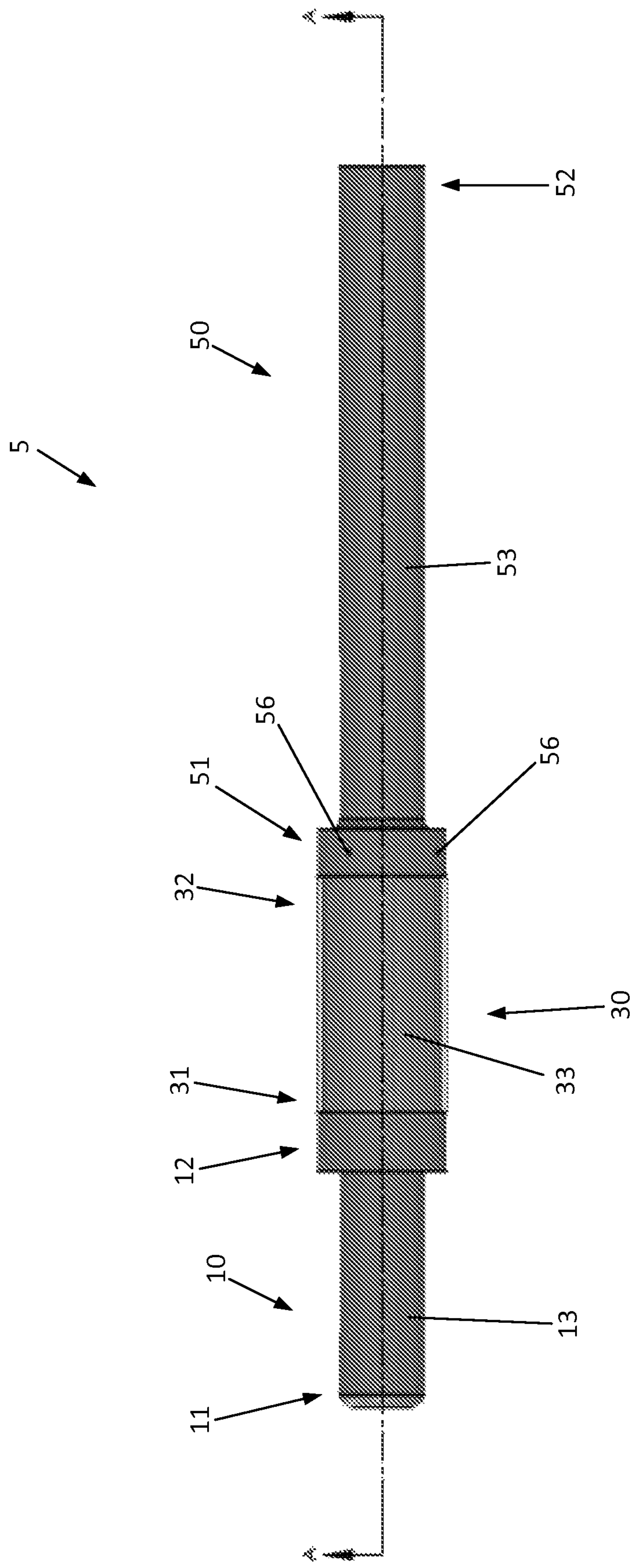
Figure 2:
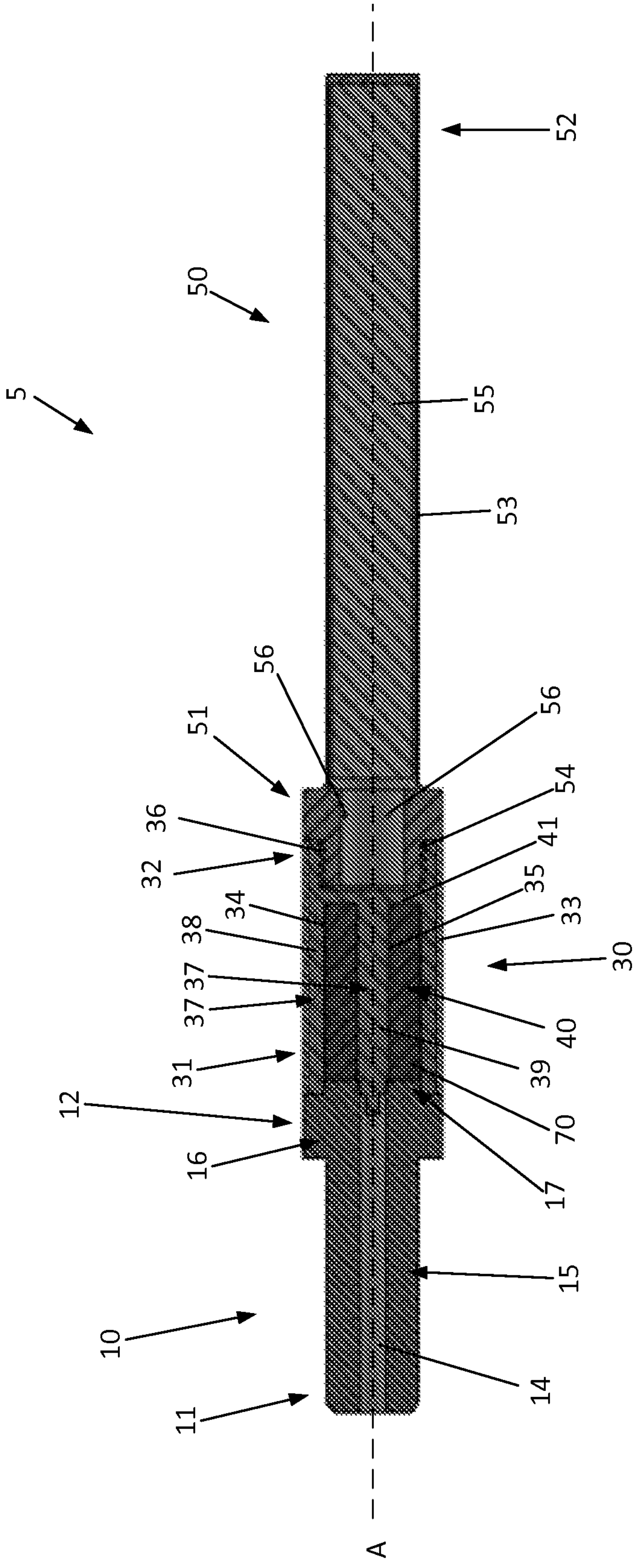
Figure 3B:
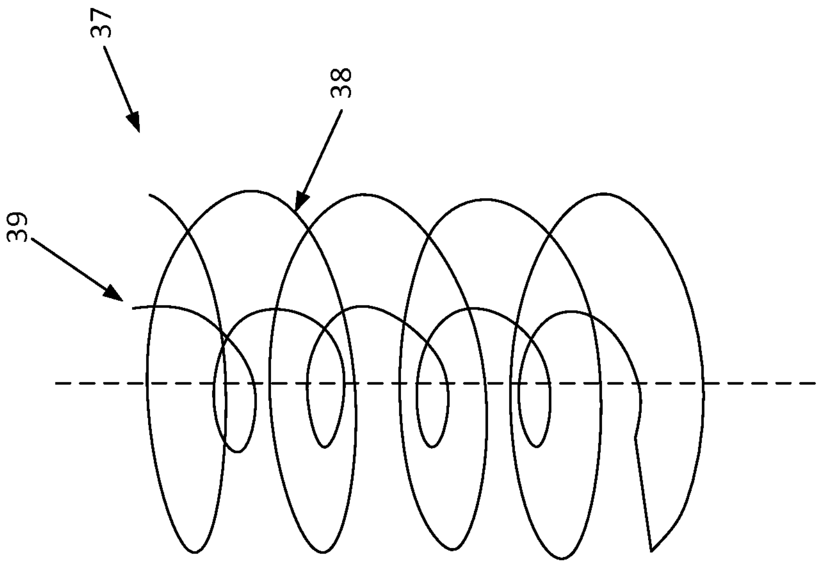
Figure 3A:
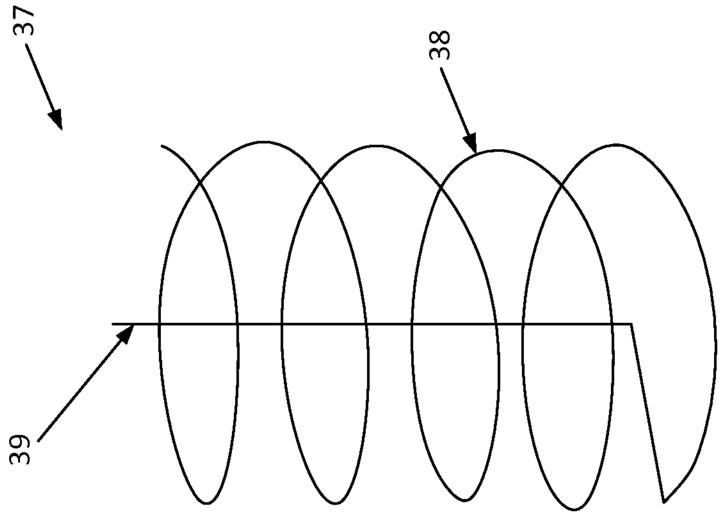
Figure 4A:
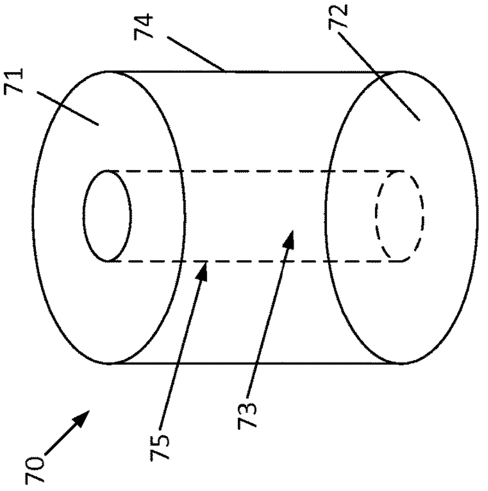
Figure 4B:
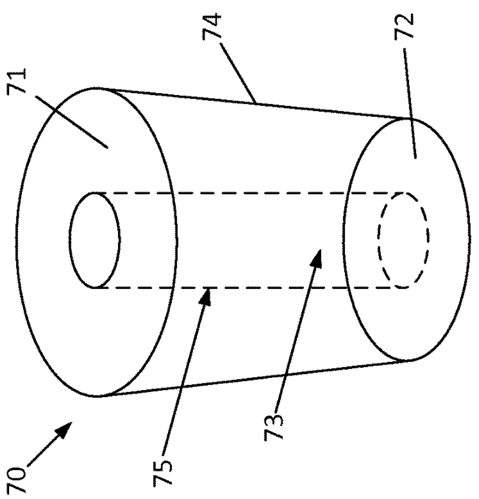
Figure 4C:
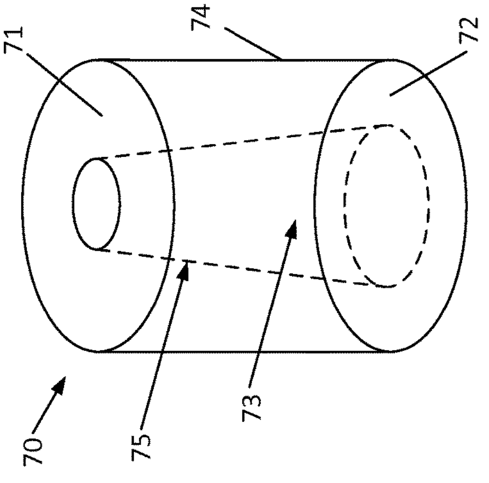
Figure 4D:
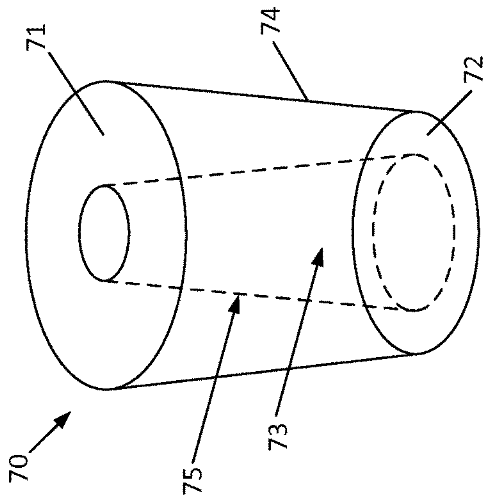
Figure 5:
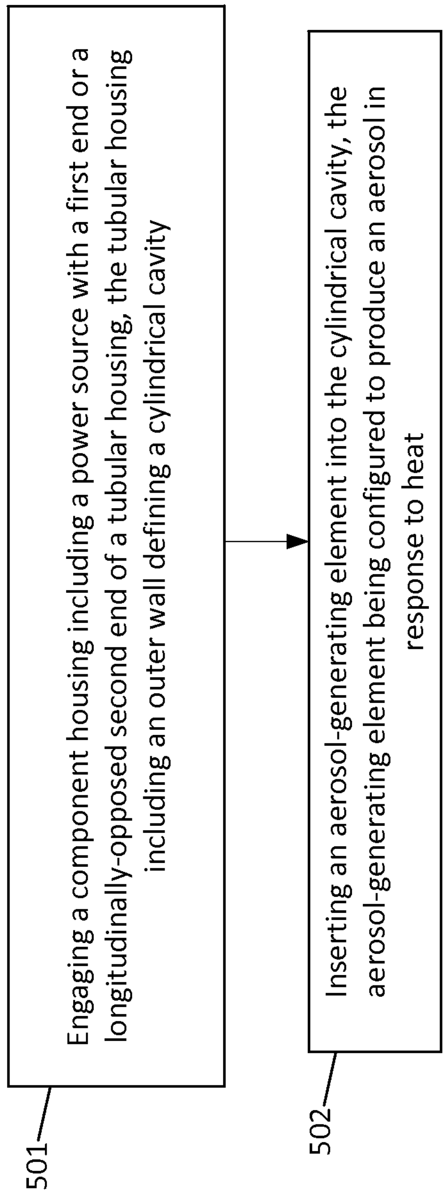
Figure 6:
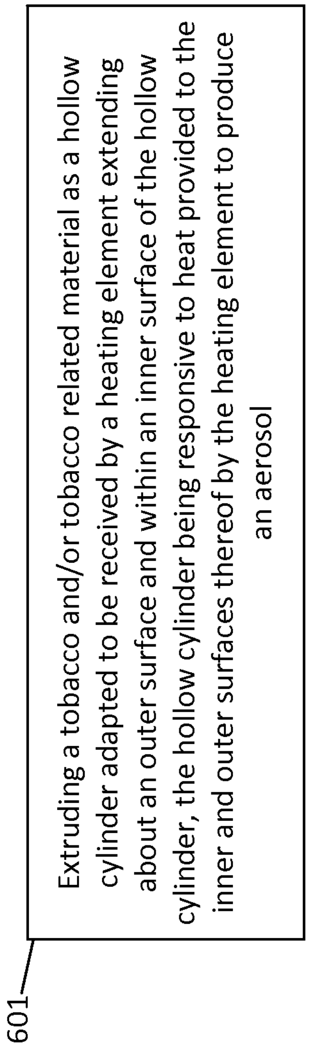
Figure 7:
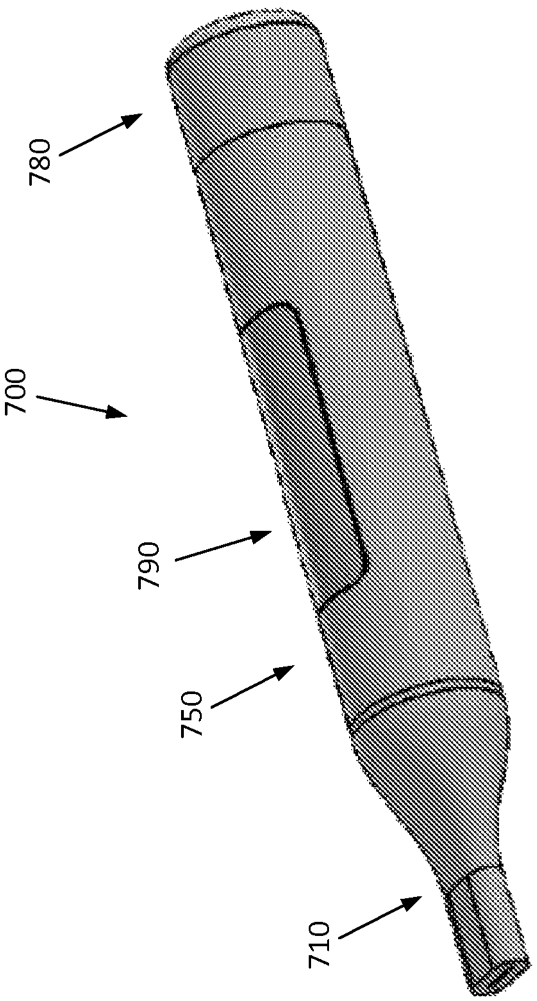
Figure 8A:
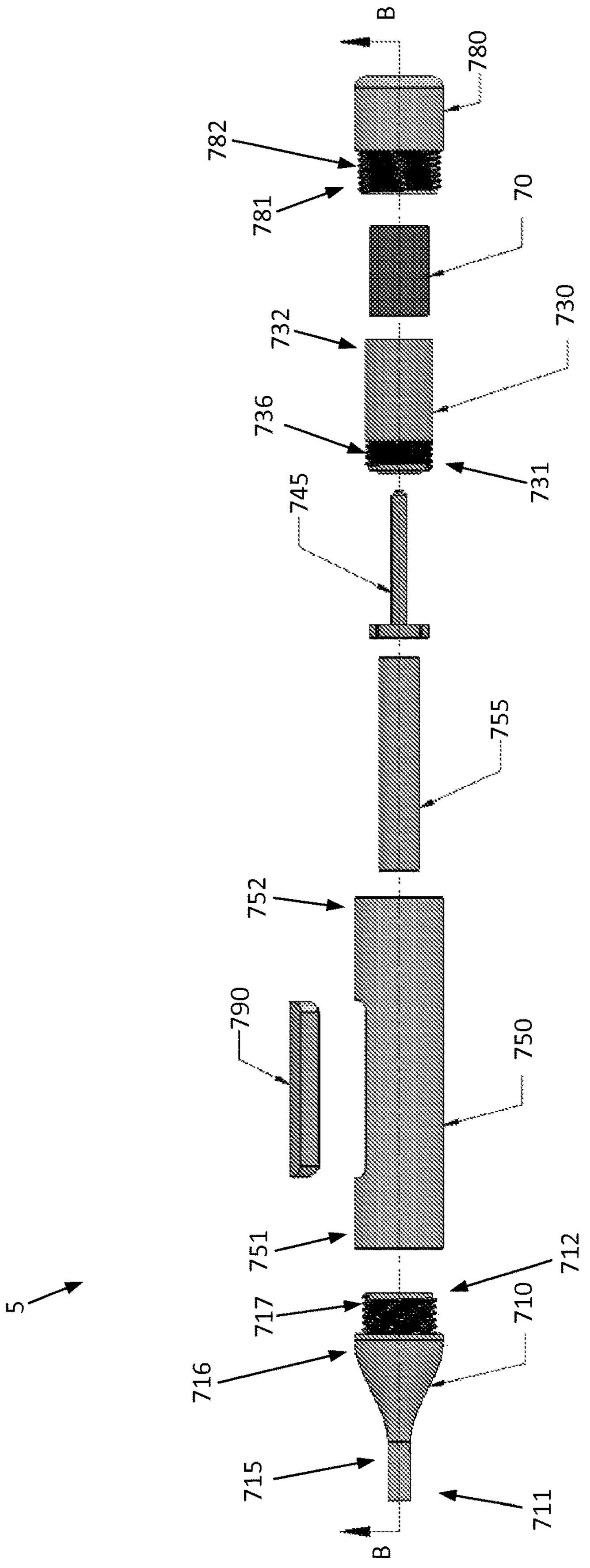
Figure 8B:
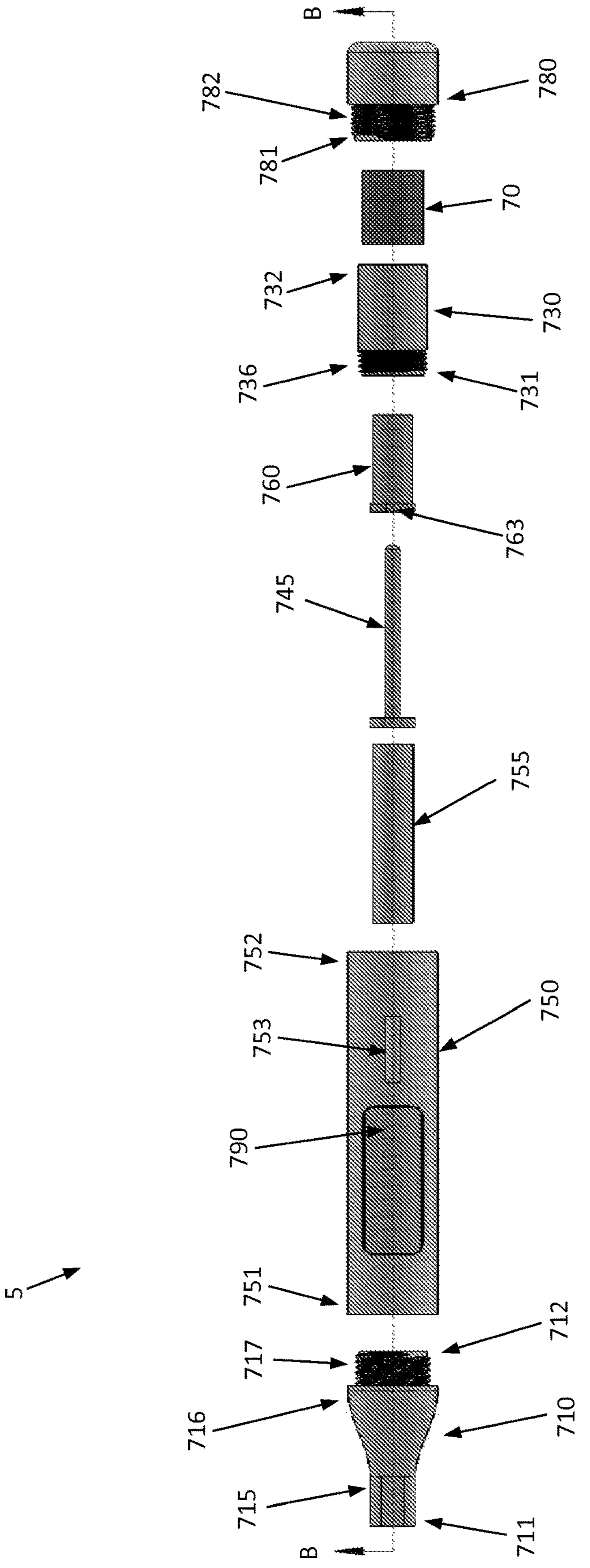
Figure 8C:
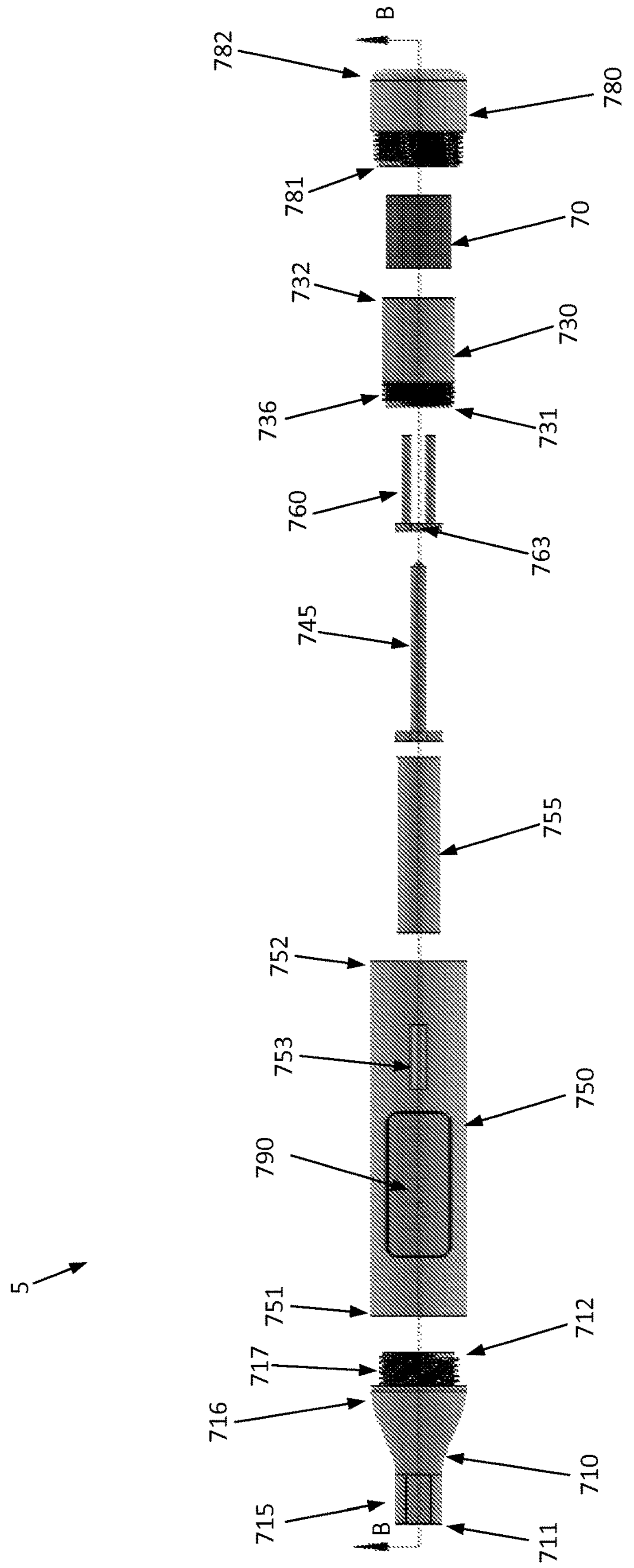
Figure 9A:
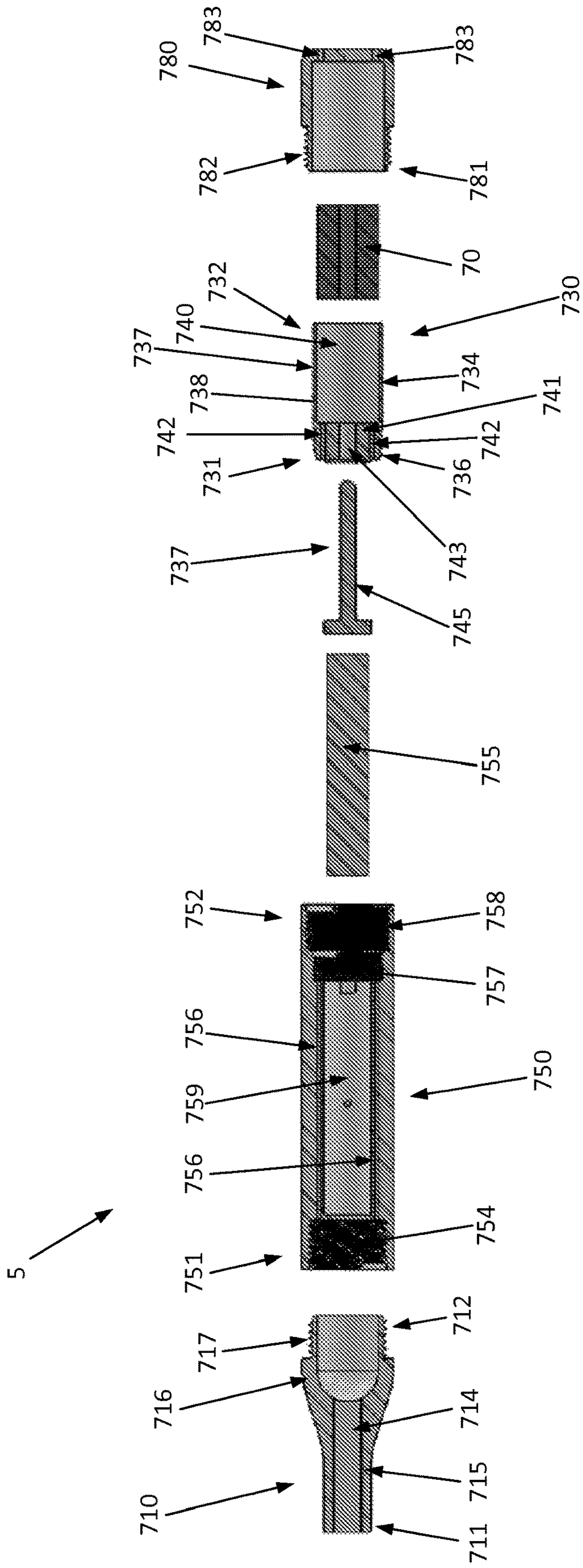
Figure 9B:
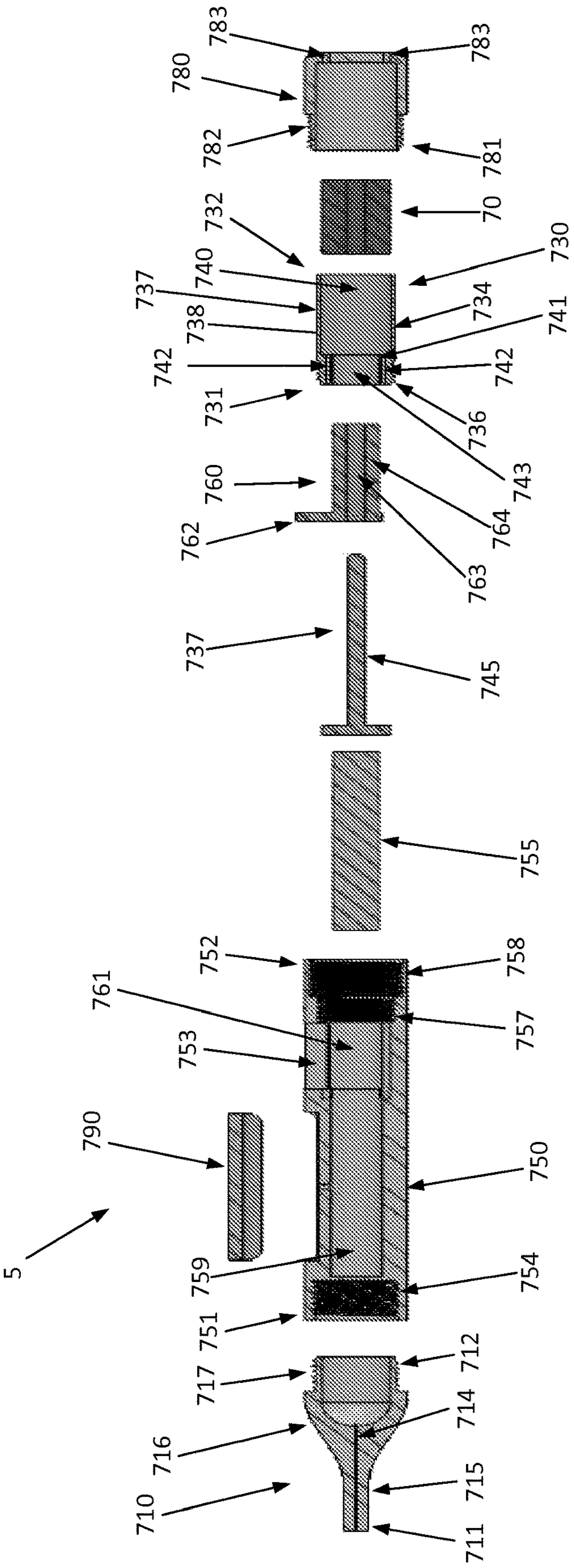
Figure 9C:
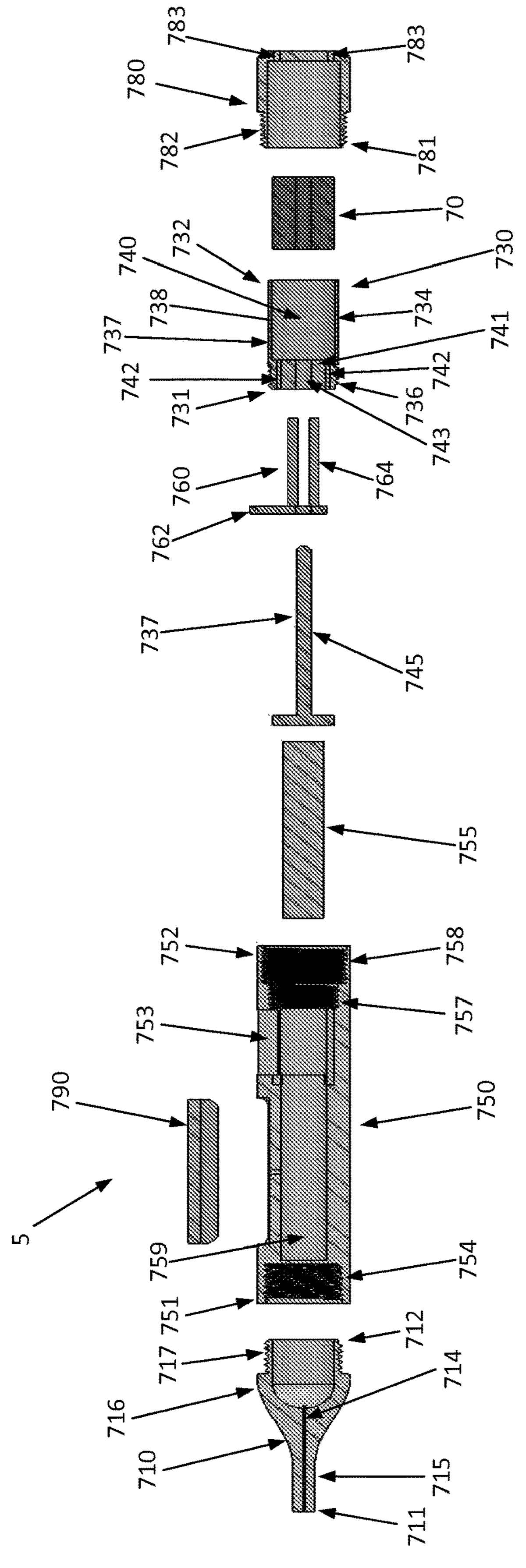
Figure 10A:
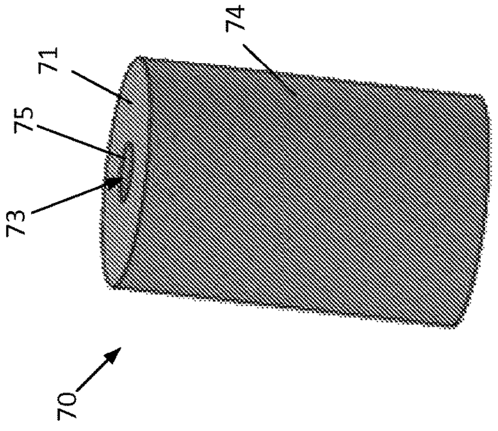
Figure 10B:
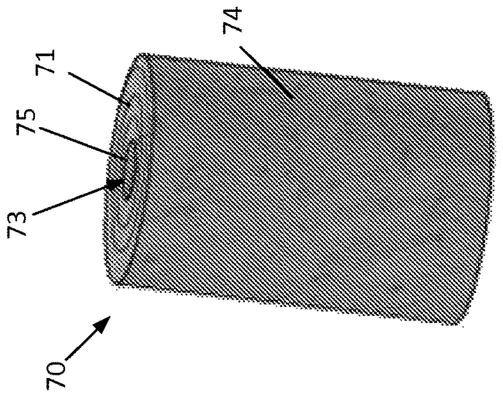
Figure 10C:
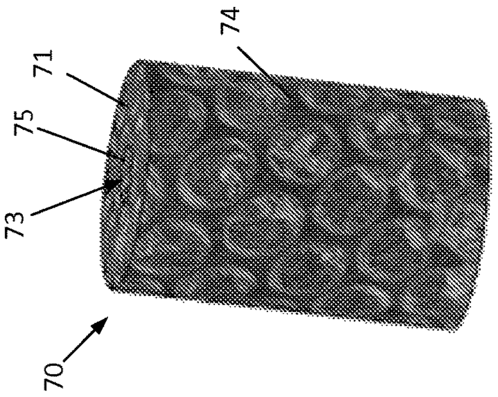
Figure 10D:
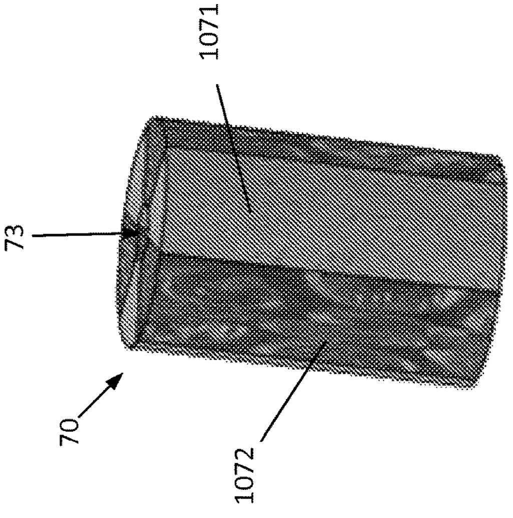
Figure 10E:
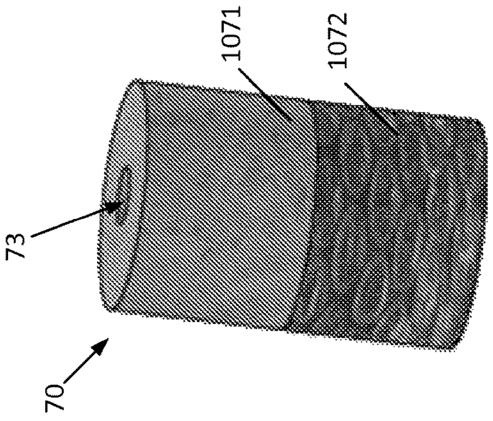

Having thus described the disclosure in the foregoing general terms, reference will now be made to the accompanying drawings, which are not necessarily drawn to scale, and wherein:

FIG. 1 illustrates an example aspect of an electronic smoking article in an assembled configuration, the electronic smoking article having the general configuration of an electronic cigarette that includes at least a mouthpiece, a component housing including a power source, and a tubular housing positioned therebetween, according to an example aspect of the present disclosure;

FIG. 2 illustrates a cross-sectional view taken along line A-A of an electronic smoking article of FIG. 1 in an assembled configuration, wherein a portion of the mouthpiece, the component housing, and the tubular housing of the article are removed to provide detail of interior components;

FIG. 3A illustrates an exemplary heating element according to one aspect of the present disclosure;

FIG. 3B illustrates an exemplary heating element according to another aspect of the present disclosure;

FIG. 4A illustrates an exemplary aerosol-generating element according to one aspect of the present disclosure;

FIG. 4B illustrates an exemplary aerosol-generating element according to another aspect of the present disclosure;

FIG. 4C illustrates an exemplary aerosol-generating element according to another aspect of the present disclosure;

FIG. 4D illustrates an exemplary aerosol-generating element according to another aspect of the present disclosure;

FIG. 5 illustrates a schematic block diagram of a method of producing an electronic smoking article according to an example aspect of the present disclosure;

FIG. 6 illustrates a schematic block diagram of a method of producing an aerosol-generating element according to another aspect of the present disclosure;

FIG. 7 illustrates an example aspect of an electronic smoking article in an assembled configuration according to one aspect of the present disclosure;

FIG. 8A illustrates an exploded view of an example aspect of an electronic smoking article in an unassembled configuration according to one aspect of the present disclosure;

FIG. 8B illustrates an exploded view of an example aspect of an electronic smoking article in an unassembled configuration according to one aspect of the present disclosure;

FIG. 8C illustrates an exploded view of an example aspect of an electronic smoking article in an unassembled configuration according to one aspect of the present disclosure;

FIG. 9A illustrates a cross-sectional view taken along line B-B of an electronic smoking article in the unassembled configuration of FIG. 8A, wherein various portions of the article are removed to provide detail of interior components, according to one aspect of the present disclosure;

FIG. 9B illustrates a cross-sectional view taken along line B-B of an electronic smoking article in an unassembled configuration of FIG. 8B, wherein various portions of the article are removed to provide detail of interior components, according to one aspect of the present disclosure;

FIG. 9C illustrates a cross-sectional view taken along line B-B of an electronic smoking article in an unassembled configuration of FIG. 8C, wherein various portions of the article are removed to provide detail of interior components, according to one aspect of the present disclosure;

FIG. 10A illustrates an exemplary aerosol-generating element according to another aspect of the present disclosure;

FIG. 10B illustrates an exemplary aerosol-generating element according to another aspect of the present disclosure;

FIG. 10C illustrates an exemplary aerosol-generating element according to another aspect of the present disclosure;

FIG. 10D illustrates an exemplary aerosol-generating element according to another aspect of the present disclosure; and FIG. 10E illustrates an exemplary aerosol-generating element according to another aspect of the present disclosure.

DETAILED DESCRIPTION OF THE DISCLOSURE

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure provides descriptions of articles (and the manufacture thereof) that use electrical energy to heat a material (preferably without combusting the material to any significant degree) to form an aerosol and/or an inhalable substance; such articles most preferably being sufficiently compact to be considered "hand-held" devices. In certain highly preferred aspects, the articles can be characterized as smoking articles. As used herein, the term "smoking article" is intended to mean an article and/or device that provides many of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe, without any substantial degree of combustion of any component of that article and/or device. As used herein, the term "smoking article" does not necessarily mean that, in operation, the article or device produces smoke in the sense of an aerosol resulting from by-products of combustion or pyrolysis of tobacco, but rather, that the article or device yields vapors (including vapors within aerosols that can be considered to be visible aerosols that might be considered to be described as smoke-like) resulting from volatilization or vaporization of certain components, elements, and/or the like of the article and/or device. In highly preferred aspects, articles or devices characterized as smoking articles incorporate tobacco and/or components derived from tobacco.

Articles or devices of the present disclosure can also be characterized as being vapor-producing articles, aerosol delivery articles or medicament delivery articles. Thus, such articles or devices can be adapted so as to provide one or more substances in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

In use, smoking articles of the present disclosure are subjected to many of the physical actions of an individual in using a traditional type of smoking article (e.g., a cigarette, cigar or pipe that is employed by lighting with a flame and used by inhaling tobacco that is subsequently burned and/or combusted). For example, the user of a smoking article of the present disclosure can hold that article much like a traditional type of smoking article, draw on one end of that article for inhalation of an aerosol produced by that article, and take puffs at selected intervals of time.

Smoking articles of the present disclosure generally include a number of components provided within an outer shell or body. The overall design of the outer shell or body can vary, and the format or configuration of the outer body that can define the overall size and shape of the smoking article can vary. Typically, an elongated body resembling the shape of a cigarette or cigar can be a formed from a single, unitary shell; or the elongated body can be formed of two or more separable pieces. For example, a smoking article can comprise an elongated shell or body that can be substantially tubular in shape, and as such, resemble the shape of a conventional cigarette or cigar. In one aspect, a smoking article can comprise three outer shell components, bodies, or portions that are joined and are separable. For example, a smoking article can include, at one end, a power source portion comprising a component housing or shell containing one or more components (e.g., a rechargeable battery and/or various electronics, such as a controller, for controlling the operation of the smoking article), a mouthpiece portion comprising a shell containing one or more components (e.g., control components and/or various electronics for controlling the operation of the smoking article), and a heat/aerosol generating portion therebetween comprising a shell containing one or more components (e.g., a solid tobacco and/or tobacco-related material for producing an aerosol). In another aspect, a smoking article can comprise three outer shell components, bodies, or portions that are joined and are separable. Additionally or alternatively, the smoking article may include an additional component configured to be received within one or more of the three outer shell components. For example, the smoking article may include, at one end, an end cap portion, a mouthpiece portion comprising a shell containing one or more components (e.g., control components and/or various electronics for controlling the operation of the smoking article), and a power source portion therebetween comprising a component housing or shell containing one or more components (e.g., a rechargeable battery and/or other power source and/or various electronics, such as a controller, for controlling the operation of the smoking article. Additionally or alternatively, the end cap portion and/or the power source portion may be configured to receive a heat/aerosol generating portion therein comprising a body containing one or more components (e.g., a solid tobacco and/or tobacco-related material for producing an aerosol). Additionally, various smoking article designs and component arrangements can be appreciated upon consideration of the commercially available electronic smoking articles, such as those representative products listed in the background art section of the present disclosure.

Smoking articles of the present disclosure most preferably comprise some combination of a power source (e.g., an electrical power source), at least one control component (e.g., means for actuating, controlling, regulating and ceasing power for heat generation, such as by controlling electrical current flow from the power source to other components of the article), a heater or heat generation component (e.g., an electrical resistance heating element or component commonly referred to as an "atomizer"), an aerosol-generating element (e.g., a solid tobacco and/or tobacco-related material), and a mouth-end region, portion, or tip for allowing draw upon the smoking article for aerosol inhalation (e.g., a defined air flow path through the article such that aerosol generated can be withdrawn therefrom upon draw). Alignment of the components within the article can vary. In specific aspects, the aerosol generating element can be disposed between a mouth-end region and a power source. Other configurations, however, are not excluded. For example, in some aspects, the power source may be disposed between the mouth-end region and the aerosol generating element. Generally, the heater component can be positioned sufficiently near that aerosol generating element so that heat from the heater component can volatilize the aerosol generating element (as well as one or more flavorants, medicaments, or the like that may likewise be provided for delivery to a user) and form an aerosol for delivery to the user. When the heating element heats the aerosol generating element, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof. Additionally, the selection of various smoking article components can be appreciated upon consideration of the commercially available electronic smoking articles, such as those representative products listed in the background art section of the present disclosure.

According to aspects of the present disclosure, a smoking article incorporates a battery or other electrical power source to provide electrical current flow sufficient to provide various functionalities to the article, such as resistive heating, powering of control systems, powering of indicators, and the like. The power source can take on various aspects. Preferably, the power source is able to deliver sufficient power to rapidly heat the heating element to provide for aerosol formation and power the article through use for the desired duration of time. The power source preferably is sized to fit conveniently within the article so that the article can be easily handled; and additionally, a preferred power source is of a sufficiently light weight to not detract from a desirable smoking experience.

Examples of useful power sources include lithium ion batteries that preferably are rechargeable (e.g., a rechargeable lithium-manganese dioxide battery). In particular, lithium polymer batteries can be used as such batteries can provide increased safety. Other types of batteries—e.g., N50-AAA CADNICA nickel-cadmium cells—may also be used. Even further examples of batteries that can be used according to the disclosure are described in U.S. Pub. App. No. 2010/0028766 to Peckerar et al., the disclosure of which is incorporated herein by reference in its entirety. Thin film batteries may be used in certain aspects of the disclosure. Any of these batteries or combinations thereof can be used in the power source, but rechargeable batteries are preferred because of cost and disposal considerations associated with disposable batteries. In aspects wherein disposable batteries are provided, the smoking article can include access for removal and replacement of the battery. Alternatively, in aspects where rechargeable batteries are used, the smoking article can comprise charging contacts, for interaction with corresponding contacts in a conventional recharging unit deriving power from a standard 120-volt AC wall outlet, or other sources such as an automobile electrical system or a separate portable power supply, including USB connections. Means for recharging the battery can be provided in a portable charging case that can include, for example, a relatively larger battery unit that can provide multiple charges for the relatively smaller batteries present in the smoking article. The article further can include components for providing a non-contact inductive recharging system such that the article can be charged without being physically connected to an external power source. Thus, the article can include components to facilitate transfer of energy from an electromagnetic field to the rechargeable battery within the article.

In some aspects, the power source also can comprise one or more capacitors. For example, the power source may include a combination of any number of batteries and/or capacitors. In some aspects, the power source may include at least one battery and at least one capacitor. Capacitors are capable of discharging more quickly than batteries and can be charged between puffs, allowing the battery to discharge into the capacitor at a lower rate than if it were used to power the heating element directly. For example, a supercapacitor—i.e., an electric double-layer capacitor (EDLC)—may be used separate from or in combination with a battery. When used alone, the supercapacitor may be recharged before each use of the article. Thus, the disclosure also may include a charger component that can be attached to the smoking article between uses to replenish the supercapacitor.

The smoking article can further include a variety of power management software, hardware, and/or other electronic control components. For example, such software, hardware, and/or electronic controls can include such functionality as carrying out charging of the battery, detecting the battery charge and discharge status, performing power save operations, preventing unintentional or over-discharge of the battery, and/or the like.

A “controller”, “control component”, and/or “control unit” according to the present disclosure can encompass a variety of elements useful in the present smoking article. Moreover, a smoking article according to the disclosure can include one, two, or even more control units that can be combined into a unitary element or that can be present at separate locations within the smoking article, and individual control units can be utilized for carrying out different control aspects. For example, a smoking article can include a control unit that is integral to or otherwise combined with a battery so as to control electrical power discharge from the battery. The smoking article separately can include a control unit that controls other functions of the article, such as regulation of the heating component to provide for a particular heating temperature for the aerosol generating element. Alternatively, a single controller may be provided that carries out multiple control functions or all control functions of the article. Likewise, a sensor (e.g., a puff and/or draw sensor) used in the article can include a control unit that controls the actuation of power discharge from the power source in response to a stimulus. The smoking article separately can include a control unit that controls other functions of the article. Alternatively, a single controller may be provided in or otherwise associated with the sensor for carrying out multiple control functions or all control functions of the article. Thus, it can be seen that a variety of combinations of controllers may be combined in the present smoking article to provide the desired level of control of all functionality of the article.

The smoking article can also comprise one or more controller units useful for controlling flow of electrical energy from the power source to further components of the article, such as to a heating element. Specifically, the article can comprise a control unit that actuates electrical current flow from the power source to the heating element. According to some aspects of the present disclosure, the smoking article can include a pushbutton that can be linked to a control circuit for manual control of electrical current flow, wherein a consumer can use the pushbutton to turn on the article and/or to actuate electrical current flow to the heating element. Multiple buttons can be provided for manual performance of powering the article on and off, and for activating heating of a heating element such as, for example, a resistive heating element, for aerosol generation. One or more pushbuttons present can be substantially flush with an outer surface of the smoking article.

Instead of (or in addition to) the pushbutton, the smoking article can include one or more control units responsive to the consumer's drawing on the article (i.e., puff-actuated heating). For example, the article may include a switch that is sensitive either to pressure changes or air flow changes as the consumer draws on the article (i.e., a puff-actuated switch). Other suitable current actuation/deactuation mechanisms may include a temperature actuated on/off switch or a lip pressure actuated switch. An exemplary mechanism that can provide such puff-actuation capability includes a Model 163PC01D36 silicon sensor, manufactured by the MicroSwitch division of Honeywell, Inc., Freeport, Ill. With such sensor, the heating element can be activated rapidly by a change in pressure when the consumer draws on the article. In addition, flow sensing devices, such as those using hot-wire anemometry principles, may be used to cause the energizing of the heating element sufficiently rapidly after sensing a change in air flow. A further puff actuated switch that may be used is a pressure differential switch, such as Model No. MPL-502-V, range A, from Micro Pneumatic Logic, Inc., Ft. Lauderdale, Fla. Another suitable puff actuated mechanism is a sensitive pressure transducer (e.g., equipped with an amplifier or gain stage) which is in turn coupled with a comparator for detecting a predetermined threshold pressure. Yet another suitable puff actuated mechanism is a vane which is deflected by airflow, the motion of which vane is detected by a movement sensing means. Yet another suitable actuation mechanism is a piezoelectric switch. Also useful is a suitably connected Honeywell MicroSwitch Microbridge Airflow Sensor, Part No. AWM 2100V from MicroSwitch Division of Honeywell, Inc., Freeport, Ill. Further examples of demand-operated electrical switches that may be employed in a heating circuit according to the present disclosure are described in U.S. Pat. No. 4,735,217 to Gerth et al., which is incorporated herein by reference in its entirety. Other suitable differential switches, analog pressure sensors, flow rate sensors, or the like, will be apparent to the skilled artisan with the knowledge of the present disclosure. A pressure-sensing tube or other passage providing fluid connection between the puff-actuated switch and an air flow passage within the smoking article can be included so that pressure changes during draw are readily identified by the switch. Further description of current regulating circuits and other control units, including microcontrollers that can be useful in the present smoking article are provided in U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., and U.S. Pat. No. 7,040,314 to Nguyen et al., all of which are incorporated herein by reference in their entireties.

Capacitive sensing components in particular can be incorporated into the device in a variety of manners to allow for diverse types of "power-up" and/or "power-down" for one or more components of the device. Capacitive sensing can include the use of any sensor incorporating technology based on capacitive coupling including, but not limited to, sensors that detect and/or measure proximity, position or displacement, humidity, fluid level, pressure, or acceleration. Capacitive sensing can arise from electronic components providing for surface capacitance, projected capacitance, mutual capacitance, or self-capacitance. Capacitive sensors generally can detect anything that is conductive or has a dielectric different than that of air. Capacitive sensors, for example, can replace mechanical buttons (i.e., the pushbutton referenced above) with capacitive alternatives. Thus, one specific application of capacitive sensing according to the disclosure is a touch capacitive sensor. For example, a touchable portion (i.e., a touch pad) can be present on the smoking article that allows the user to input a variety of commands. Most basically, the touch pad can provide for powering the heating element much in the same manner as a push button, as already described above. In other aspects, capacitive sensing can be applied near the mouth end of the smoking article such that the presence and/or pressure of the lips on the smoking article or draw on the article can signal the device to provide power to the heating element. In addition to touch capacitance sensors, motion capacitance sensors, liquid capacitance sensors, and accelerometers can be utilized according to the disclosure to elicit a variety of response from the smoking article. Further, photoelectric sensors also can be incorporated into the inventive smoking article.

Sensors utilized in the present smoking articles can expressly signal for power flow to the heating element so as to heat the aerosol generating element and form an aerosol for inhalation by a user. Sensors can also provide further functions. For example, a "wake-up" sensor can be included. Other sensing methods providing similar function likewise can be utilized according to the disclosure.

When the consumer draws on the mouth end of the smoking article, actuation means can permit unrestricted or uninterrupted flow of electrical current through the heating element to generate heat rapidly. Because of the rapid heating, it can be useful to include current regulating components to (i) regulate current flow through the heating element to control heating of the resistive element and the temperature experienced thereby, and (ii) prevent overheating and degradation of the aerosol generating elements.

The current regulating circuit particularly may be time based. Specifically, such a circuit includes means for permitting uninterrupted current flow through the heating element for an initial time period during draw, and timer means for subsequently regulating current flow until draw is completed. For example, the subsequent regulation can include the rapid on-off switching of current flow (e.g., on the order of about every 1 to 50 milliseconds) to maintain the heating element within the desired temperature range. Further, regulation may comprise simply allowing uninterrupted current flow until the desired temperature is achieved, and then turning off the current flow completely. The heating element may be reactivated by the consumer initiating another puff on the article (or manually actuating the pushbutton, depending upon the specific switch aspect employed for activating the heater). Alternatively, the subsequent regulation can involve the modulation of current flow through the heating element to maintain the heating element within a desired temperature range. In some aspects, so as to release the desired amount of the inhalable substance, the heating element may be energized for a duration of about 0.2 second to about 5.0 seconds, about 0.3 second to about 4.5 seconds, about 0.5 second to about 4.0 seconds, about 0.5 second to about 3.5 seconds, or about 0.6 second to about 3.0 seconds. One exemplary time-based current regulating circuit can include a transistor, a timer, a comparator, and a capacitor. Suitable transistors, timers, comparators, and capacitors are commercially available and will be apparent to the skilled artisan. Exemplary timers are those available from NEC Electronics as C-1555C and from General Electric Intersil, Inc. as ICM7555, as well as various other sizes and configurations of so-called "555 Timers". An exemplary comparator is available from National Semiconductor as LM311.

Further description of such time-based current regulating circuits and other control units that can be useful in the present smoking article are provided in U.S. Pat. Nos. 4,922,901, 4,947,874, and 4,947,875, all to Brooks et al., all of which are incorporated herein by reference in their entireties.

The control units particularly can be configured to closely control the amount of heat provided to the heating element. In some aspects, a current regulating component can function to stop current flow to the heating element once a defined temperature has been achieved. Such defined temperature can be in a range that is substantially high enough to volatilize the aerosol generating element and any further inhalable substances and provide an amount of aerosol equivalent to a typical puff on a conventional cigarette, as otherwise discussed herein. While the heat needed to volatilize the aerosol generating element in a sufficient volume to provide a desired volume for a single puff can vary, it can be particularly useful for the heating element to heat to a temperature of about 120° C. or greater, about 130° C. or greater, about 140° C. or greater, or about 160° C. In some aspects, in order to volatilize an appropriate amount of the aerosol generating element, the heating temperature may be about 180° C. or greater, about 200° C. or greater, about 300° C. or greater, or about 350° C. or greater. In additional aspects, the defined temperature for aerosol formation can be about 120° C. to about 350° C., about 140° C. to about 300° C., or about 150° C. to about 250° C. The temperature and time of heating can be controlled by one or more components contained in the smoking article. For example, the temperature may be controlled by one or more components that may be responsive to a user input so as to provide for a particular desired temperature such as, for example, an aerosol generating element heating temperature, a standby temperature, and/or the like. In some aspects, the temperature may be controlled by one or more components that may be responsive to a user input such that a user may select a desired aerosol generating heating temperature based at least upon the composition of the aerosol generating element. The current regulating component likewise can cycle the current to the resistive heating element off and on once a defined temperature has been achieved so as to maintain the defined temperature for a defined period of time.

Still further, the current regulating component can cycle the current to the heating element off and on to maintain a first temperature that is below an aerosol forming temperature and then allow an increased current flow in response to a current actuation control component so as to achieve a second temperature that is greater than the first temperature and that is an aerosol forming temperature. Such controlling can improve the response time of the article for aerosol formation such that aerosol formation begins almost instantaneously upon initiation of a puff by a consumer. According to some aspects, the first temperature (which can be characterized as a standby temperature) can be only slightly less than the aerosol forming temperature defined above. Specifically, the standby temperature can be about 50° C. to about 150° C., about 70° C. to about 140° C., about 80° C. to about 120° C., or about 90° C. to about 110° C.

In addition to the above control elements, the smoking article also may comprise one or more indicators or indicia. Such indicators or indicia may be lights (e.g., light emitting diodes) that can provide indication of multiple aspects of use of the inventive article. Further, LED indicators may be positioned at the distal end of the smoking article to simulate color changes seen when a conventional cigarette is lit and drawn on by a user. Other indices of operation are also encompassed by the present disclosure. For example, visual indicators of operation also may include changes in light color or intensity to show progression of the smoking experience. Tactile indicators of operation and sound indicators of operation similarly are encompassed by the disclosure. Moreover, combinations of such indicators of operation also may be used in a single smoking article. According to another aspect, the smoking article may include one or more indicators or indicia, such as, for example, a display configured to provide information corresponding to the operation of the smoking article such as, for example, the amount of power remaining in the power source, progression of the smoking experience, indication corresponding to activating a heating element, and/or the like.

A smoking article, according to the disclosure, can further comprise a heating element that heats an aerosol generating element to produce an aerosol for inhalation by a user. In various aspects, the heating element can be formed of a material that provides resistive heating when an electrical current is applied thereto. Preferably, the heating element exhibits an electrical resistance making a resistive heating element useful for providing a sufficient quantity of heat when electrical current flows therethrough. Interaction of the heating element with the aerosol generating element may be through, for example, heat conduction, heat radiation, and/or heat convection.

Electrically conductive materials useful as resistive heating elements can be those having low mass, low density, and moderate resistivity and that are thermally stable at the temperatures experienced during use. Useful heating elements heat and cool rapidly, and thus provide for the efficient use of energy. Rapid heating of the element can be beneficial to provide almost immediate volatilization of an aerosol generating element in proximity thereto. Rapid cooling (i.e., to a temperature below the volatilization temperature of the aerosol generating element/component/composition/material) prevents substantial volatilization (and hence waste) of the aerosol generating element during periods when aerosol formation is not desired. Such heating elements also permit relatively precise control of the temperature range experienced by the aerosol generating element, especially when time based current control is employed. Useful electrically conductive materials preferably are chemically non-reactive with the materials being heated (e.g., aerosol generating elements and/or other inhalable substance materials) so as not to adversely affect the flavor or content of the aerosol or vapor that is produced. Exemplary, non-limiting, materials that can be used as the electrically conductive material include carbon, graphite, carbon/graphite composites, metals, metallic and non-metallic carbides, nitrides, silicides, inter-metallic compounds, cermets, metal alloys, and metal foils. In particular, refractory materials may be useful. Various, different materials can be mixed to achieve the desired properties of resistivity, mass, and thermal conductivity. In specific aspects, metals that can be utilized include, for example, nickel, chromium, alloys of nickel and chromium (e.g., nichrome), and steel. Materials that can be useful for providing resistive heating are described in U.S. Pat. No. 5,060,671 to Counts et al.; U.S. Pat. No. 5,093,894 to Deevi et al.; U.S. Pat. No. 5,224,498 to Deevi et al.; U.S. Pat. No. 5,228,460 to Sprinkel Jr., et al.; U.S. Pat. No. 5,322,075 to Deevi et al.; U.S. Pat. No. 5,353,813 to Deevi et al.; U.S. Pat. No. 5,468,936 to Deevi et al.; U.S. Pat. No. 5,498,850 to Das; U.S. Pat. No. 5,659,656 to Das; U.S. Pat. No. 5,498,855 to Deevi et al.; U.S. Pat. No. 5,530,225 to Hajaligol; U.S. Pat. No. 5,665,262 to Hajaligol; U.S. Pat.

No. 5,573,692 to Das et al.; and U.S. Pat. No. 5,591,368 to Fleischhauer et al., the disclosures of which are incorporated herein by reference in their entireties.

The heating element can be provided in a variety forms, such as in the form of a foil, a foam, discs, spirals, fibers, wires, films, yarns, strips, ribbons, or cylinders. In some aspects, a resistive heating element according to the present disclosure can be a conductive substrate, such as described in U.S. Pat. App. Pub. No. 2013/0255702 to Griffith et al., the disclosure of which is incorporated herein by reference in its entirety.

Beneficially, a resistive heating element can be provided in a form that enables the heating element to be positioned in intimate contact with or in close proximity to the aerosol generating element (i.e. to provide heat to the aerosol generating element through, for example, conduction, radiation, or convection). In other aspects, a resistive heating element can be provided in a form such that the aerosol generating element can be positioned proximate to the resistive heating element for substantially even distribution of heat for aerosolization of the aerosol generating element.

In certain aspects, a smoking article according to the present disclosure can include an aerosol generating element that may include tobacco, a tobacco component, or a tobacco-derived material (i.e., a material that is found naturally in tobacco that may be isolated directly from the tobacco or synthetically prepared). In some aspects, the aerosol generating element may include a blend of flavorful and aromatic tobaccos in cut filler form. In another aspect, the aerosol generating element may include a reconstituted tobacco material, such as described in U.S. Pat. No. 4,807,809 to Pryor et al.; U.S. Pat. No. 4,889,143 to Pryor et al. and U.S. Pat. No. 5,025,814 to Raker, the disclosures of which are incorporated herein by reference in their entirety. Additionally, a reconstituted tobacco material may include a reconstituted tobacco paper described for the type of cigarettes described in Chemical and Biological Studies on New Cigarette Prototypes that Heat Instead of Burn Tobacco, R. J. Reynolds Tobacco Company Monograph (1988), the contents of which are incorporated herein by reference in its entirety. For example, a reconstituted tobacco material may include a sheet-like material containing tobacco and/or tobacco-related materials. In some aspects, the aerosol generating element may be formed from a wound roll of a reconstituted tobacco material. In another aspect, the aerosol generating element may be formed from shreds, strips, and/or the like of a reconstituted tobacco material.

According to another aspect, a smoking article according to the present disclosure can include an aerosol generating element that may include a porous, inert material such as, for example, a ceramic material. In another aspect, the aerosol generating element may include a porous, inert material that does not substantially react, chemically and/or physically, to a tobacco-related material such as, for example, a tobacco-derived extract.

Tobacco that may be employed can include, or can be derived from, tobaccos such as flue-cured tobacco, burley tobacco, Oriental tobacco, Maryland tobacco, dark tobacco, dark-fired tobacco and *Rustica* tobacco, as well as other rare or specialty tobaccos, or blends thereof. Various representative tobacco types, processed types of tobaccos, and types of tobacco blends are set forth in U.S. Pat. No. 4,836,224 to Lawson et al.; U.S. Pat. No. 4,924,888 to Perfetti et al.; U.S. Pat. No. 5,056,537 to Brown et al.; U.S. Pat. No. 5,159,942 to Brinkley et al.; U.S. Pat. No. 5,220,930 to Gentry; U.S. Pat. No. 5,360,023 to Blakley et al.; U.S. Pat. No. 6,701,936 to Shafer et al.; U.S. Pat. No. 6,730,832 to Dominguez et al.; U.S. Pat. No. 7,011,096 to Li et al.; U.S. Pat. No. 7,017,585 to Li et al.; U.S. Pat. No. 7,025,066 to Lawson et al.; U.S. Pat. App. Pub. No. 2004/0255965 to Perfetti et al.; PCT Pub. No. WO 02/37990 to Bereman; and Bombick et al., *Fund. Appl. Toxicol.,* 39, p. 11-17 (1997); the disclosures of which are incorporated herein by reference in their entireties.

According to another aspect of the present disclosure, an aerosol generating element may include tobacco, a tobacco component, and/or a tobacco-derived material that may be treated, manufactured, produced, and/or processed to incorporate an aerosol-forming material (e.g., humectants such as, for example, propylene glycol, glycerin, and/or the like) and/or at least one flavoring agent, as well as a burn retardant (e.g., diammonium phosphate and/or another salt) configured to help prevent ignition, pyrolysis, combustion, and/or scorching of the aerosol generating element by the heating element. Various manners and methods for incorporating tobacco into smoking articles, and particularly smoking articles that are designed so as to not purposefully burn virtually all of the tobacco within those smoking articles, are set forth in U.S. Pat. No. 4,947,874 to Brooks et al.; U.S. Pat. No. 7,647,932 to Cantrell et al.; U.S. Pat. No. 8,079,371 to Robinson et al.; U.S. Pat. No. 7,290,549 to Banerjee et al.; and U.S. Pat. App. Pub. No. 2007/0215167 to Crooks et al.; the disclosures of which are incorporated herein by reference in their entireties.

According to one aspect of the present disclosure, flame/burn retardant materials and additives that may be included within the aerosol generating element may include organo-phosophorus compounds, borax, hydrated alumina, graphite, potassium tripolyphosphate, dipentaerythritol, pentaerythritol, and polyols. Others such as nitrogenous phosphonic acid salts, mono-ammonium phosphate, ammonium polyphosphate, ammonium bromide, ammonium borate, ethanolammonium borate, ammonium sulphamate, halogenated organic compounds, thio-urea, and antimony oxides may be used but are not preferred agents. In each aspect of flame-retardant, burn-retardant, and/or scorch-retardant materials used in the aerosol generating element and/or other components (whether alone or in combination with each other and/or other materials), the desirable properties most preferably are provided without undersirable off-gassing or melting-type behavior.

According to another aspect of the present disclosure, the aerosol generating element can also incorporate tobacco additives of the type that are traditionally used for the manufacture of tobacco products. Those additives can include the types of materials used to enhance the flavor and aroma of tobaccos used for the production of cigars, cigarettes, pipes, and the like. For example, those additives can include various cigarette casing and/or top dressing components. See, for example, U.S. Pat. No. 3,419,015 to Wochnowski; U.S. Pat. No. 4,054,145 to Berndt et al.; U.S. Pat. No. 4,887,619 to Burcham, Jr. et al.; U.S. Pat. No. 5,022,416 to Watson; U.S. Pat. No. 5,103,842 to Strang et al.; and U.S. Pat. No. 5,711,320 to Martin; the disclosures of which are incorporated herein by reference in their entireties. Preferred casing materials include water, sugars and syrups (e.g., sucrose, glucose and high fructose corn syrup), humectants (e.g. glycerin or propylene glycol), and flavoring agents (e.g., cocoa and licorice). Those added components also include top dressing materials (e.g., flavoring materials, such as menthol). See, for example, U.S. Pat. No. 4,449,541 to Mays et al., the disclosure of which is incorporated herein by reference in its entirety. Further materials that can be added include those disclosed in U.S. Pat. No. 4,830,028 to Lawson et al. and U.S. Pat. No. 8,186,360 to Marshall et al., the disclosures of which are incorporated herein by reference in their entireties.

For example, in some aspects, the aerosol generating element can comprise one or more different components, such as an aerosol-forming material such as, for example, polyhydric alcohol (e.g., glycerin, propylene glycol, or a mixture thereof). Representative types of further aerosol-forming materials are set forth in U.S. Pat. No. 4,793,365 to Sensabaugh, Jr. et al.; U.S. Pat. No. 5,101,839 to Jakob et al.; PCT WO 98/57556 to Biggs et al.; and Chemical and Biological Studies on New Cigarette Prototypes that Heat Instead of Burn Tobacco, R. J. Reynolds Tobacco Company Monograph (1988); the disclosures of which are incorporated herein by reference. In some aspects, an aerosol generating element can produce a visible aerosol upon the application of sufficient heat thereto (and cooling with air, if necessary), and the aerosol generating element can produce an aerosol that can be considered to be "smoke-like." In other aspects, the aerosol generating element can produce an aerosol that can be substantially non-visible but can be recognized as present by other characteristics, such as flavor or texture. Thus, the nature of the produced aerosol can vary depending upon the specific components of the aerosol generating element. The aerosol generating element can be chemically simple relative to the chemical nature of the smoke produced by burning tobacco.

A wide variety of types of flavoring agents, or materials that alter the sensory or organoleptic character or nature of the mainstream aerosol of the smoking article, can be employed. Such flavoring agents can be provided from sources other than tobacco and can be natural or artificial in nature. Of particular interest are flavoring agents that are applied to, or incorporated within, the aerosol generating element and/or those regions of the smoking article where an aerosol is generated. Again, such agents can be supplied directly to a heating cavity proximate to the resistive heating element or may be provided on a substrate. Exemplary flavoring agents include vanillin, ethyl vanillin, cream, tea, coffee, fruit (e.g., apple, cherry, strawberry, peach and citrus flavors, including lime and lemon), maple, menthol, mint, peppermint, spearmint, wintergreen, nutmeg, clove, lavender, cardamom, ginger, honey, anise, sage, cinnamon, sandalwood, jasmine, cascarilla, cocoa, licorice, and flavorings and flavor packages of the type and character traditionally used for the flavoring of cigarette, cigar, and pipe tobaccos. Syrups, such as high fructose corn syrup, also can be employed. Flavoring agents also can include acidic or basic characteristics (e.g., organic acids, such as levulinic acid, succinic acid, and pyruvic acid). The flavoring agents can be combined with the aerosol-generating material if desired. Exemplary plant-derived compositions that may be used are disclosed in U.S. application Ser. No. 12/971,746 to Dube et al. and U.S. application Ser. No. 13/015,744 to Dube et al., the disclosures of which are incorporated herein by reference in their entireties. The selection of such further components can vary based upon factors such as the sensory characteristics that are desired for the present article, and the present disclosure is intended to encompass any such further components that may be readily apparent to those skilled in the art of tobacco and tobacco-related or tobacco-derived products. See, Gutcho, Tobacco Flavoring Substances and Methods, Noyes Data Corp. (1972) and Leffingwell et al., Tobacco Flavoring for Smoking Products (1972), the disclosures of which are incorporated herein by reference in their entireties.

Any of the materials, such as flavorings, casings, and the like that can be useful in combination with a tobacco material to affect sensory properties thereof, including organoleptic properties, such as already described herein, may be combined with the aerosol generating element. Organic acids particularly may be incorporated into the aerosol generating element to affect the flavor, sensation, or organoleptic properties of medicaments, such as nicotine, that may be combined with the aerosol generating element. For example, organic acids, such as levulinic acid, lactic acid, and pyruvic acid, may be included in the aerosol generating element with nicotine in amounts up to being equimolar (based on total organic acid content) with the nicotine. Any combination of organic acids can be used. For example, the aerosol generating element can include about 0.1 to about 0.5 moles of levulinic acid per one mole of nicotine, about 0.1 to about 0.5 moles of pyruvic acid per one mole of nicotine, about 0.1 to about 0.5 moles of lactic acid per one mole of nicotine, or combinations thereof, up to a concentration wherein the total amount of organic acid present is equimolar to the total amount of nicotine present in the aerosol generating element. Various additional examples of organic acids employed to produce an aerosol generating element are described in U.S. patent application Ser. No. 14/721,283 to Dull et al., filed May 26, 2015, which is incorporated herein in its entirety by reference.

In still another aspect of the present disclosure, the aerosol generating element may be configured as an extruded structure and/or substrate that may include, or may essentially be comprised of tobacco, tobacco-related material, glycerin, water, and/or a binder material, although certain formulations may exclude the binder material. The binder material may be any binder material commonly used for tobacco formulations including, for example, carboxymethyl cellulose (CMC), gum (e.g. guar gum), xanthan, pullulan, and/or an alginate. According to some aspects, the binder material included in the aerosol generating element may be configured to substantially maintain a structural shape and/or integrity of the aerosol generating element. Various representative binders, binder properties, usages of binders, and amounts of binders are set forth in U.S. Pat. No. 4,924,887 to Raker et al., which is incorporated herein by reference in its entirety.

In another aspect, the aerosol generating element may include a plurality of microcapsules, beads, granules, and/or the like having a tobacco-related material. For example, a representative microcapsule may be generally spherical in shape, and may have an outer cover or shell that contains a liquid center region of a tobacco-derived extract and/or the like. In some aspects, the aerosol generating element may include a plurality of microcapsules substantially formed into a hollow cylindrical shape. In one aspect, the aerosol generating element may include a binder material configured to substantially maintain the structural shape and/or integrity of the plurality of microcapsules substantially formed into the hollow cylindrical shape.

In some aspects, the aerosol generating element may be configured as an extruded material, as described in U.S. Pat. App. Pub. No. 2012/0042885 to Stone et al., which is incorporated herein by reference in its entirety. In yet another aspect, the aerosol generating element may include an extruded structure and/or substrate formed from marumarized and/or non-marumarized tobacco. Marumarized tobacco is known, for example, from U.S. Pat. No. 5,105, 831 to Banerjee, et al., which is incorporated by reference herein in its entirety. Marumarized tobacco may include about 20 to about 50 percent (by weight) tobacco blend in powder form, with glycerol (at about 20 to about 30 percent weight), calcium carbonate (generally at about 10 to about 60 percent by weight, often at about 40 to about 60 percent by weight), along with binder agents, as described herein, and/or flavoring agents.

The aerosol generating element may take on a variety of conformations based upon the various amounts of materials utilized therein. For example, a useful aerosol generating element may comprise up to about 98% by weight up to about 95% by weight, or up to about 90% by weight of a tobacco and/or tobacco material. A useful aerosol generating element also can comprise up to about 25% by weight, about 20% by weight or about 15% by weight water—particularly about 2% to about 25%, about 5% to about 20%, or about 7% to about 15% by weight water. Flavors and the like (which can include medicaments, such as nicotine) can comprise up to about 10%, up to about 8%, or up to about 5% by weight of the aerosol generating element.

Additionally or alternatively, the aerosol generating element may be configured as an extruded structure and/or substrate that may include or may essentially be comprised of tobacco, glycerin, water, and/or binder material, and may be further configured to substantially maintain its structure throughout the aerosol generating process. That is, the aerosol generating element may be configured to substantially maintain its shape (i.e., the aerosol generating element does not continually deform under an applied shear stress) throughout the aerosol generating process. Although the aerosol generating element may include liquids and/or may have some moisture content, the aerosol generating element remains substantially solid throughout the aerosol generating process and substantially maintains structural integrity throughout the aerosol generating process. Exemplary tobacco and/or tobacco related materials suitable for a substantially solid aerosol generating element are described in U.S. patent application Ser. No. 14/098,137, filed on Dec. 5, 2013 to Ademe et al.; U.S. patent application Ser. No. 14/282,768, filed on May 20, 2014 to Sears et al.; U.S. Pat. No. 6,164,287 to White; and U.S. Pat. No. 5,060,676 to Hearn et al., which are all incorporated herein in their entirety by reference respectively.

The amount of aerosol generating element that is used within the smoking article is such that the article exhibits acceptable sensory and organoleptic properties, and desirable performance characteristics. For example, it is highly preferred that sufficient aerosol-forming material such as, for example, glycerin and/or propylene glycol, be employed within the aerosol generating element in order to provide for the generation of a visible mainstream aerosol that in many regards resembles the appearance of tobacco smoke. Typically, the amount of aerosol-forming material incorporated into the aerosol generating element of the smoking article is in the range of about 1.5 g or less, about 1 g or less, or about 0.5 g or less.

The amount of aerosol generating element can be dependent upon factors such as the number of puffs desired per cartridge used with the smoking article. It is desirable for the aerosol generating element not to introduce significant degrees of unacceptable off-taste, filmy mouth-feel, or an overall sensory experience that is significantly different from that of a traditional type of cigarette that generates mainstream smoke by burning tobacco cut filler. The selection of the particular aerosol-forming material, the amounts of those components used, and the types of tobacco material used, can be altered in order to control the overall chemical composition of the aerosol produced by the aerosol generating element of the smoking article.

In further aspects, heating can be characterized in relation to the amount of aerosol to be generated. Specifically, the article can be configured to provide an amount of heat necessary to generate a defined volume of aerosol (e.g., about 0.5 ml to about 100 ml, or any other volume deemed useful in a smoking article, such as otherwise described herein). In certain, the amount of heat generated can be measured in relation to a two second puff providing about 35 ml of aerosol at a heater temperature of about 290° C. In some aspects, the article preferably can provide about 1 to about 50 Joules of heat per second (J/s), about 2 J/s to about 40 J/s, about 3 J/s to about 35 J/s, or about 5 J/s to about 30 J/s.

The heating element preferably is in electrical connection with the power source of the smoking article such that electrical energy can be provided to the heating element to produce heat and subsequently aerosolize the aerosol generating element and any other inhalable substance provided by the smoking article. Such electrical connection can be permanent (e.g., hard wired) or can be removable (e.g., wherein a resistive heating element is provided in a body or portion that can be attached to and detached from a power source).

Although a variety of materials for use in a smoking article according to the present disclosure have been described above—such as heaters, batteries, capacitors, switching components, aerosol generating elements, aerosol-forming materials, and/or the like, the disclosure should not be construed as being limited to only the exemplified aspects. Rather, one of skill in the art can recognize based on the present disclosure similar components in the field that may be interchanged with any specific component of the present disclosure. For example, U.S. Pat. No. 5,261,424 to Sprinkel, Jr. discloses piezoelectric sensors that can be associated with the mouth-end of a device to detect user lip activity associated with taking a draw and then trigger heating; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. App. Pub. No. 2009/0320863 by Fernando et al. discloses computer interfacing means for smoking devices to facilitate charging and allow computer control of the device; and U.S. Pat. App. Pub. No. 2010/0163063 by Fernando et al. discloses identification systems for smoking devices; all of the foregoing disclosures being incorporated herein by reference in their entireties. Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944, 8,375,957 to Hon; U.S. Pat. Pub. Nos. 2006/0196518 and 2009/0188490 to Hon; U.S. Pat. No. 8,794,231 to Thorens et al.; U.S. Pat. Nos. 8,915,254 and 8,925,555 to Monsees et al.; U.S. Pat. No. 8,851,083 and U.S. Pat. Pub. No. 2010/0024834 to Oglesby et al.; U.S. Pat. Pub. No. 2010/0307518 to Wang; and WO 2010/091593 to Hon. A variety of the materials disclosed by the foregoing documents may be incorporated into the present devices in various aspects, and all of the foregoing disclosures are incorporated herein by reference in their entireties.

Although an article according to the disclosure may take on a variety of aspects, as discussed in detail below, the use of the smoking article by a consumer will be similar in scope. In particular, the smoking article can be provided as a single unit or as a plurality of housings containing various components that are combined by the consumer for use and then are dismantled by the consumer thereafter. In one aspect, a smoking article according to the disclosure can comprise a first unit that is engageable and disengageable with a second unit, and a third unit that is engageable and disengageable with the second unit, the second unit comprising the resistive heating element, and the third unit comprising the electrical power source. According to another aspect, a smoking article can comprise a first unit that is engageable and disengageable with a third unit, and a second unit that is engageable and disengageable with the third unit, the second unit comprising the resistive heating element, and the third unit comprising the electrical power source. In some aspects, the third unit further can comprise one or more control components that actuate or regulate current flow from the electrical power source. According to another aspect, the second unit may compromise one or more control components that actuate or regulate current flow from the electrical power source of the third unit. In yet another aspect, the second and third unit may comprise one or more control components that actuate and regulate the current flow from the electrical power source of the third unit to a resistive heating element of the second unit.

According to another aspect, any of the first, second, and/or third units may comprise one or more control components that actuate and regulate the current flow from the electrical power source to the resistive heating unit. The first unit can comprise a distal end that engages the second unit and an opposing, proximate end that defines a mouthpiece (or simply the mouth end) with an opening at a proximate end thereof. In another aspect, the first unit can comprise a distal end that engages the third unit and an opposing, proximate end that defines a mouthpiece (or simply the mouth end) with an opening at a proximate end thereof. The first unit, second unit, and/or third unit can comprise an air flow path or passageway into the mouthpiece of the first unit, and the air flow path can provide for passage of an aerosol formed by heat from the resistive heating element into the mouth piece. In one aspect, the first unit may be disposable, while the second and third unit may be reusable. According to another aspect, the first, second, and third unit may be reusable.

More specifically, a smoking article according to one aspect of the disclosure can have a reusable tubular housing that is substantially cylindrical in shape, the reusable tubular housing having a first end and an opposing second end. In some aspects, the first end may be a mouthpiece-engaging end and the opposing second end may be a component-engaging end. The smoking article can further include a reusable component housing or power source portion that is substantially cylindrical in shape having a first end and an opposing second end. In some aspects, the first end may be a tubular housing-engaging end and the second end of the reusable component housing or power source portion may be an opposing distal end, which may include one or more indicators of active use of the smoking article. The tubular housing-engaging end of the component housing may be configured to operably connect the power source within the component housing to the tubular housing containing the heating element (i.e., resistive heating element). The article may further comprise a reusable or disposable mouthpiece portion that is substantially cylindrical in shape having a first end and an opposing second end. According to some aspects, the first end may be a mouth-engaging end for drawing upon the article, and the opposing second end may be an opposing tubular housing-engaging end configured to connect the mouthpiece portion to the tubular housing. To use the smoking article, the consumer can connect the power source within the component housing to the tubular housing containing the heating element, place an aerosol generating element within the tubular housing in operable engagement with the heating element, and connect the mouthpiece portion to the tubular housing to enclose the heating element and the aerosol generating element. In some aspects, the respective engaging ends of the mouthpiece portion, the tubular housing, and the component housing may include complementary-threaded surfaces for a screw-type engagement. In other aspects, the engaging ends of the various housings and/or mouthpiece portions can have a press-fit engagement, magnetic engagement, or any other suitable type of engagement capable of maintaining the various portions and/or housings in engagement with one another.

A smoking article according to another aspect of the disclosure can have a reusable tubular housing that is substantially cylindrical in shape, the reusable tubular housing having a first end and an opposing second end. In some aspects, the first end may be a component-engaging end, and the opposing second end may be configured to receive an aerosol generating element therethrough. In some aspects, the opposing second end of the reusable tubular housing may be configured to operably engage an end cap housing. The smoking article can further include a reusable component housing or power source portion that is substantially cylindrical in shape having a first end and an opposing second end. In some aspects, the first end may be a mouthpiece-engaging end, and the opposing second end of the reusable component housing or power source portion may be configured to operably engage a component housing-engaging end of a tubular housing and/or operably engage an end cap housing. In some aspects, the end cap housing and the component housing or power source portion may be configured, at least in part, to completely and/or partially enclose the tubular housing therebetween and/or therein. The tubular housing-engaging end of the component housing may be configured to operably connect the power source within the component housing to the tubular housing, which in some aspects, may contain a heating element (i.e., resistive heating element). In another aspect, the component housing may be configured to receive a portion of the tubular housing and may be further configured to operably connect the power source within the component housing to a portion of a heating element (i.e., resistive heating element) that is configured to operably engage the tubular housing. The article may further comprise a reusable or disposable mouthpiece portion that is substantially cylindrical in shape having a first end and an opposing second end. According to some aspects, the first end may be a mouth-engaging end for drawing upon the article, and the opposing second end may be an opposing component housing-engaging end configured to connect the mouthpiece portion to the component housing. To use the smoking article, the consumer can connect the power source within the component housing to at least one portion of a heating element configured to be received within the tubular housing. In some aspects, the tubular housing may include a second portion of a heating element. In yet another aspect, the consumer can connect the power source within the component housing to the tubular housing containing at least one portion of the heating element. The consumer may then place an aerosol generating element within the tubular housing in operable engagement with the heating element, and enclose the tubular housing within the component housing and/or an end cap housing to enclose the heating element and the aerosol generating element. The consumer may then operably connect the mouthpiece portion to the component housing. In some aspects, the respective engaging ends of the mouthpiece portion, the tubular housing, and the component housing may include complementary-threaded surfaces for a screw-type engagement. In other aspects, the engaging ends of the various housings and/or mouthpiece portions can have a press-fit engagement, magnetic engagement, or any other suitable type of engagement capable of maintaining the various portions and/or housings in engagement with one another.

During use, the consumer initiates heating of the heating element such as, for example, a resistive heating element, and the heat produced by the resistive heating element produces an aerosol and, optionally, further inhalable substances, from the aerosol generating element. Such heating releases at least a portion of the aerosol generating element in the form of an aerosol (which can include any further inhalable substances included therewith), and such aerosol is provided within a space associated with the heating element (e.g., a heating cavity) within the tubular housing that is in fluid communication with the mouth-engaging end of the mouthpiece portion. When the consumer inhales on the mouth-engaging end of the mouthpiece portion, air is drawn through at least one or all of the component housing, the tubular housing, and the mouthpiece portion, and the combination of the drawn air and the aerosol is received by the consumer as the drawn materials exit the mouth-engaging end of the mouthpiece portion into the mouth of the consumer.

To initiate heating, the consumer may actuate a pushbutton, capacitive sensor, or similar component that causes the heating element to receive electrical energy from the power source (e.g., a battery or other energy source such as a capacitor). In another aspect, the consumer may initiate heating by drawing upon the mouth-engaging end of the mouthpiece, thereby activating a draw sensor configured to cause the heating element to receive electrical energy from the power source. The electrical energy may be supplied for a pre-determined length of time or may be manually controlled. Preferably, flow of electrical energy does not substantially proceed in between puffs on the article (although energy flow may proceed to maintain a baseline temperature greater than ambient temperature—e.g., a temperature that facilitates rapid heating to the active heating temperature). In additional aspects, heating may be initiated by the puffing action of the consumer through use of various sensors, as otherwise described herein. Once the puff is discontinued, heating will stop or be reduced. When the consumer has taken a sufficient number of puffs so as to have released a sufficient amount of the aerosol and/or inhalable substance (e.g., an amount sufficient to equate to a typical smoking experience), the aerosol generating element can be removed from the heating cavity and discarded. Indication that the aerosol generating element is spent (i.e., the aerosol generating element has substantially provided the known amount of aerosol that the aerosol generating element can provide to the consumer) can be provided by an indicator or other suitable indicia. In some aspects, a single aerosol generating element can provide more than a single smoking experience and thus may provide a sufficient content of aerosol generating element to simulate as much as a plurality of conventional cigarettes.

The foregoing description of use of the article can be applied to the various aspects described through minor modifications, which can be apparent to the person of skill in the art in light of the further disclosure provided herein. The above description of use, however, is not intended to limit the use of the inventive article but is provided to comply with all necessary requirements of disclosure of the present disclosure.

Referring now to FIGS. 1 and 2, a smoking article 5 according to the present disclosure generally can comprise a mouthpiece portion 10, a tubular housing 30 defining a space (i.e., a heating cavity 40) associated with a heating element 37, and a component housing 50 that includes a power source. According to some aspects, each of the mouthpiece portion 10, tubular housing 30, and the component housing 50 may further include additional components therein. The mouthpiece portion 10 may further define a mouth-engaging end 11 (i.e., the end upon which a consumer can draw to inhale aerosol from the article) and a tubular housing-engaging end 12 that is longitudinally opposed to the mouth-engaging end. The tubular housing 30 may define a first, mouthpiece-engaging end 31 and a second, longitudinally opposed component-engaging end 32, which may be configured to operably engage a tubular housing-engaging end 51 of the component housing 50. As shown in FIG. 1, the component-engaging end 32 of the tubular housing 30 may be longitudinally opposed to the mouthpiece-engaging end 31 of the tubular housing. The illustrated article is provided as a smoking article device having multiple components, but any of the mouthpiece portion, tubular housing, and/or component housing may be integrally formed with any of the other portions. As will be evident from further disclosure herein, it may be preferable for aspects of the smoking article to be formed of three or more separate portions that are joined together, each containing separate components of the smoking article therein.

The smoking article 5 according to the disclosure can have an overall shape that may be defined as being substantially rod-like or substantially tubular shaped or substantially cylindrically shaped. As illustrated in FIGS. 1 and 2, the mouthpiece portion 10, the tubular housing 30, and/or the component housing 50 may each have a substantially round cross-section; however, other cross-sectional shapes (e.g., oval, square, triangle, etc.) also are encompassed by the present disclosure. In addition, the tubular housing 30 may have a substantially round cross-section with a diameter greater than those diameters of the substantially round cross-sections of the mouthpiece portion 10 and/or the component housing 50. Such language that is descriptive of the physical shape of the smoking article may also be applied to an article in aspects where the portions are unified as a single piece and/or less than three distinct and separable portions.

The outer shell 13 of the mouthpiece portion 10 may be formed of any material suitable for forming and maintaining an appropriate conformation, such as a tubular shape, and for retaining therein the suitable components of the mouthpiece portion. Likewise, an outer shell 33 of the tubular housing 30 may be formed of any material suitable for forming and maintaining an appropriate conformation, such as a tubular shape, and for retaining therein the suitable components of the tubular housing. Further, an outer shell 53 of the component housing 50 may also be formed of any material suitable for forming and maintaining an appropriate conformation, such as a tubular shape, and for retaining therein the suitable components of the component housing. According to some aspects, the outer shells 13, 33, 53 may be formed of substantially the same material. In some aspects, the outer shells 13, 33, 53 may be formed of a material (natural or synthetic) that is heat resistant so as to retain its structural integrity (e.g., the materials do not degrade in response to heat) at least at a temperature that is the heating temperature provided by the resistive heating element, as further described herein. In some aspects, a heat resistive polymer may be used. In other aspects, ceramic materials may be used. In particular aspects, the outer shells 13, 33, 53 may be comprised of a stainless steel material and/or other metallic materials. According to some aspects, the outer shell 33 of the tubular housing 30, when formed of a single layer, can have a thickness of about 0.2 mm to about 5.0 mm, about 0.5 mm to about 4.0 mm, about 0.5 mm to about 3.0 mm, or about 1.0 mm to about 3.0 mm. Further exemplary types of components and materials that may be used to provide the functions described above or be used as alternatives to the materials and components noted above can be those of the types set forth in U.S. Pat. No. 8,464,726 to Sebastian et al., the disclosure of which is incorporated herein by reference in its entirety.

As shown in FIGS. 1 and 2, the smoking article 5 may comprise a component housing 50 including a tubular housing-engaging end 51 and a distal end 52 that are longitudinally opposed from one another. As illustrated in FIG. 2, the tubular housing-engaging end 51 of the component housing 50 defines an engagement feature 54 on the outer surface of the component housing configured to engage and/or operably connect the component housing 50 to the tubular housing 30 for use. In some aspects, the engagement feature 54 may include a threaded surface configured for a screw-type engagement with a complementary engagement feature 36 (e.g., a complementary threaded surface configured to engage the threaded surface of the engagement feature 54) of the tubular housing 30. In another aspect, the engagement feature 54 and complementary engagement feature 36 may define a press-fit engagement; however, other types of engagement features (e.g., magnets, snap-fit, etc.) also are encompassed by the present disclosure.

In some aspects, the component housing 50 may define at least one passageway 56, so as to provide for air to be drawn therethrough and into the tubular housing 30. Particularly, the component housing 50 may, in some instances, further define at least one passageway 56 configured to be in fluid communication with the tubular housing 30. Additionally or alternatively, the tubular housing 30 may include a wall member 41 that extends laterally between the outer wall 34 and the inner wall 35 of the tubular housing, as described in greater detail herein. The wall member 41 may define at least one orifice therethrough configured to provide an air flow path into a heating cavity 40, which is also described in greater detail herein. In some instances, the at least one orifice may be arranged and configured to fluidly connect and communicate with the at least one passageway 56 defined by the component housing 50 so as to provide for air to be drawn therethrough and into the heating cavity 40 via the at least one orifice. Further, the one or more passageways 56 may also be in fluid communication, via the heating cavity 40, with a mouthpiece channel 14. Accordingly, in response to a draw upon the mouth-engaging end 11 of the mouthpiece portion 10, air may, in turn, be drawn through the at least one fluid passageway 56 of the component housing 50, through the at least one orifice defined by the wall member 41, into the heating cavity 40 of the tubular housing 30, and through the mouthpiece channel 14 to the mouth-engaging end of the mouthpiece portion. As such, according to some aspects, the heating cavity 40 may be configured to release an aerosol (which can include any further inhalable substances included therewith) from the aerosol generating element 70 and through the mouthpiece channel 14 to the mouth-engaging end of the mouth piece portion, in response to the draw.

Additionally, the article 5 can include one or more status indicators or other indicia positioned on any one or combination of the outer shells 13,33,53. Such indicators, as discussed above, can show the number of puffs taken from or remaining within the article, can be indicative of an active or inactive status, can light up in response to a puff, draw, and/or the like. According to one aspect, an indicator may be disposed in association with component housing 50 and may be configured to provide an indication of the amount of energy remaining within the battery 55. The use of any number of indicators or other indicia is also encompassed by the present disclosure, and the indicators or other indicia can be associated with an opening in a shell, through which opening an audible alert may be emitted when appropriate.

According to some aspects of the present disclosure, the component housing 50 may further include a power source, such as a battery 55, and at least one electronic control unit (not shown), and these components can be placed in a variety of orders within the component housing 50. Although not expressly shown, it is understood that the smoking article 5, and the component housing 50 in particular, can include wiring or other conductor arrangements, as necessary, to provide electrical current from the battery 55 to the additional components and to interconnect the components for appropriate operation of the necessary functions provided by the smoking article 5. For example, the smoking article 5 may include wiring (not shown) within the component housing 50 and/or the tubular housing 30 as necessary to provide electrical current from the battery 55 of the component housing 50 to a heating element 37 located within the tubular housing 30. According to another aspect of the present disclosure, the smoking article may include wiring or other conductor arrangements (not shown) within the component housing 50 and/or tubular housing 30 as necessary to provide electrical current from the battery 55 of the component housing 50 to one or more status indicators and/or other indicia positioned on any one or combination of the outer shells 13, 33, 53 and/or disposed within any of the mouthpiece portion 10, tubular housing 30 and/or component housing 50.

As illustrated in FIG. 2, the smoking article 5 may include a mouthpiece portion 10 that includes a tubular housing-engaging end configured to engage and/or operably connect the mouthpiece portion to the mouthpiece-engaging end 31 of the tubular housing 30. According to another aspect of the present disclosure, the mouthpiece-engaging end 31 of the tubular housing 30 may include an engagement feature 17 configured to engage and/or operably connect the tubular housing to the mouthpiece portion 10.

In some aspects, the engagement feature configured to engage and/or operably connect the tubular housing 30 to the mouthpiece portion 10 may include a snap-fit and/or press-fit type of engagement. In other instances, a threaded engagement may be implemented. According to some aspects, the tubular housing 30 may include a mouthpiece-engaging end 31 configured to receive the mouthpiece portion 10 such that the mouthpiece portion engages the aerosol generating element 70, which may be disposed within the tubular housing 30. As such, the mouthpiece-engaging end 31 may be configured such that the mouthpiece portion 10 urges the aerosol generating element 70 (i.e., against a biasing element, as discussed in further detail herein) into the heating cavity 40, upon engagement between the mouthpiece portion 10 and the tubular housing 30.

According to some aspects, the mouthpiece portion 10 may be substantially cylindrical in shape. As shown in FIG. 2, the mouthpiece portion 10 may include a first portion 15 proximate to the mouth-engaging end 11 and a second portion 16 proximate the tubular housing-engaging end. The air flow channel 14 may extend longitudinally through both the first portion 15 and the second portion 16 of the mouthpiece portion 10. As shown in FIG. 2, the first portion 15 and the second portion 16 may both be substantially cylindrically shaped. Although the first portion 15 and the second portion 16 are both illustrated as having substantially circular cross-sections, other cross-sectional shapes (e.g., square, oval, etc.) are encompassed by the present disclosure. FIG. 2 further illustrates the first portion 15 of the mouthpiece portion 10 having a smaller diameter than the diameter of the second portion 16. In some aspects, the first portion 15 may have a larger diameter than the second portion 16 of the mouthpiece portion. In yet another aspect, the first portion 15 may have a diameter substantially similar to the diameter of the second portion 16. FIG. 2, however, illustrates that the second portion 16 of the mouthpiece portion has an outermost diameter substantially similar to the outermost diameter of the shell of the tubular housing 30. As such, when the mouthpiece portion 10 is operably engaged with the tubular housing 30, the engagement provides for a uniform transition between the mouthpiece portion and the tubular housing. Additionally, in some aspects, the mouthpiece portion 10 may include material that is substantially heat-resistant. In some aspects, the mouthpiece portion 10 may include a stainless steel material. According to some aspects, the heat generated by the heating element 37 within the heating cavity 40 may be sufficient to produce an aerosol from the aerosol generating element, while the mouthpiece portion 10 remains relatively cooler.

As shown in FIG. 2, the smoking article 5 may include a tubular housing 30 that includes a mouthpiece-engaging end 31 and a longitudinally opposed component-engaging end 32. The component-engaging end 32, according to one example aspect, defines a complementary engagement feature 36 that is configured to engage and/or operably connect the tubular housing 30 to the tubular housing-engaging end of the component housing 50, as previously discussed above.

According to some aspects of the present disclosure, the tubular housing 30 may include electrical conductors, as necessary, to complete an electrical circuit with the battery 55 and heating element 37. Further, the tubular housing 30 may include appropriate electrical conductors such that the electrical circuit is operable when the tubular housing 30 is operably connected to both the mouthpiece portion 10 and the component housing 50. In some instances, the electrical circuit may only be operable when the aerosol generating element 70 is present in the heating cavity 40 of the assembled article. In some aspects, the heating element 37 can be electrically connected to the battery 55 through appropriate wiring or appropriate electrical conductors extending between the terminals of the battery and the heating element 37 to facilitate formation of an electrical circuit configured to selectively direct current flow to the heating element such as, for example, a resistive heating element. In specific aspects, the article 5 can include an electrical circuit wherein at least one control component associated with the electrical circuit delivers, controls, or otherwise modulates power thereto from the battery 55 for energizing the heating element 37 according to one or more defined algorithms. Such an electrical circuit can specifically incorporate a flow sensor (not shown) such that the article 5 is only actuated upon application of a draw (i.e., at times of use by the consumer exerting a draw on the mouthpiece 10). For example, the flow sensor may be configured to detect a puff by the consumer or draw on the article, which then sends a signal to actuate the control component to direct power from the battery 55 to the heating element 37, such that the heating element produces heat to be provided to the aerosol generating element 70 within the heating cavity 40, wherein the aerosol generating element, in turn, produces and provides an aerosol, in response to the heat, wherein the aerosol is suitable for inhalation by the consumer. The control algorithm may, for example, call for power to the heating element 37 according to a defined cycle in order to maintain the heating element at a defined temperature. The control algorithm may also be programmed to automatically deactuate or discontinue power to the heating element 37 after a defined time lapse without detection of a puff or draw on the article.

According to some aspects, the article can include a temperature sensor configured and arranged to provide feedback to the control component. Such a temperature sensor can be, for example, in direct contact with the heating element 37 or disposed in association with the heating cavity 40 in proximity to the aerosol generating element 70 (i.e., such that the heating element can be controlled by the controller to maintain the heat in proximity to the aerosol generating element at a desired temperature for forming the aerosol). Alternative temperature sensing means likewise may be used, such as, for example, implementing logic control components to evaluate resistance through a resistive heating element and correlating such resistance with the temperature of the heating element 37. In other aspects, the flow sensor may be replaced to provide alternative sensing means, such as capacitive sensing, as otherwise described herein. Any variety of sensors and combinations thereof can be incorporated, as already described herein. Still further, one or more control buttons can be included to allow for manual actuation by a consumer of a variety of functions, such as powering the article 5 on and off, turning on the heating element 37 to generate the aerosol for inhalation, and/or the like.

As discussed herein, the smoking article 5 may include a heating element 37 configured to provide heat to a heating cavity 40 defined by and within the tubular housing 30. For example, the smoking article may include wiring (not shown) within the component housing 50 and/or tubular housing 30 to provide electrical current to a heating element 37 such as, for example, a resistive heating element located within the tubular housing 30, that is configured to provide heat to the heating cavity 40 defined by an outer wall 34 and an inner wall 35. In some aspects, the tubular housing 30 includes a first or outer wall 34 that is substantially cylindrical in shape. Further, the tubular housing 30 includes a second or inner wall 35 that is also substantially cylindrical in shape. As illustrated in FIG. 2, the outer wall 34 and the inner wall 35 may be aligned concentrically about a longitudinal axis A. According to one aspect, the inner wall 35 may be substantially cylindrical in shape and have a radius that is smaller than a radius defined by the substantially cylindrical shaped outer wall 34, thereby the laterally-extending space between the outer wall 34 and the inner wall 35 defining the heating cavity 40. In some aspects, the tubular housing 30 may include an outer wall 34 and an inner wall 35 that may be tapered in shape such that the distance between the outer wall 34 and inner wall 35 is smaller when measured closer to the component-engaging end 32, as compared to the distance between the outer and inner walls when measured closer to the mouthpiece-engaging end 31. Although FIG. 2 illustrates a heating cavity 40 having a substantially hollow cylindrical shape defined between the outer wall 34 and the inner wall 35, other suitable shapes (e.g., hollow, square, tapered, etc.) are also encompassed by the present disclosure. According to some aspects, the outer wall 34 and the inner wall 35 may include a heat-conducting material, suitable to provide heat within the heating cavity 40. For example, the outer wall 34 and the inner wall 35 may comprise a stainless steel material and/or other metallic material suitable to provide heat within the heating cavity.

As previously mentioned, the outer wall 34 and the inner wall 35 may define a substantially hollow cylindrical shape defined therebetween. In addition, according to some aspects, the outer wall 34 and the inner wall 35 may additionally or alternatively define longitudinally-opposed ends, with one of the longitudinally-opposed ends including a wall member 41 that extends laterally between the outer wall 34 and the inner wall 35, as shown in FIG. 2 and discussed previously herein. According to some aspects of the present disclosure, the wall member 41 may be disposed proximate toward the component-engaging end 32 of the tubular housing 30.

According to some aspects of the present disclosure, the tubular housing 30 may further include a biasing element operably engaged with one of the outer wall 34, the inner wall 35, and/or the wall member 41 of the heating cavity 40. The biasing element may be configured to provide a biasing force for biasing the aerosol generating element 70 outwardly from the heating cavity 40 when the mouthpiece portion 10 is disengaged from the tubular housing 30. For example, the biasing element may be operably engaged with the wall member 41 and may be configured to exert a biasing force against the aerosol generating element 70 longitudinally outward of the heating cavity 40. The biasing element may include a spring element and/or any suitable means for exerting a biasing force against the aerosol generating element towards the mouthpiece-engaging end 31 of the tubular housing 30 and longitudinally outward of the heating cavity 40 when the mouthpiece portion 10 is disengaged from the tubular housing.

As previously mentioned, the tubular housing 30 may include a heating element 37 configured to provide heat to the heating cavity 40. In some aspects, the heating element 37 may be configured to provide heat to the heating cavity 40 when powered by a power source, such as the battery 55. In some instances, the heating element 37 may comprise a resistive heating element, though other types of heating elements (i.e., induction, microwave, radiative etc.) may also be implemented, as necessary or desired. According to some aspects, the heating element 37 may include a spirally-configured portion 38 and an elongate member portion 39, as shown in FIGS. 3A and 3B.

In the illustrated aspect of FIG. 3A, the heating element 37 may be configured to be operably received by the wall arrangement defining the heating cavity 40. For example, the heating element 37 may include a helix or spirally-configured portion 38 with an additional elongate member portion 39 extending contiguously from the spirally-configured portion 38 and longitudinally along a central axis through the spirally-configured portion. In this manner, the spirally-configured portion 38 may be configured to extend longitudinally about the outer wall 34 defining the heating cavity 40, while the elongate member portion 39 may be configured to extend longitudinally within and along the inner wall 35 of the heating cavity. In some aspects, the elongate member portion 39 may also extend longitudinally along a central axis about which the spirally-configured portion 38 rotates. In this manner, the heating element 37 may be configured to provide heat to the heating cavity 40 both laterally through the outer wall 34 and laterally through the inner wall 35. According to some aspects, the elongate member portion 39, rather than being provided as a rod-like member, may be configured in different manners as necessary or desired. For example, the elongate member portion 39 may, in some instances, be provided as a spirally-wound or helix portion, as shown in FIG. 3B. Accordingly, one aspect of the present disclosure includes a heating element 37 having a spirally-configured portion 38 that rotates about an axis and an elongate member portion 39 that is provided as a spirally-wound or helix portion that also rotates about the same axis.

According to some aspects, the spirally-configured portion 38 may be integrally formed with the elongate member portion 39 to form a unitary heating element 37, as shown in FIGS. 3A and 3B. In one aspect, a first portion (e.g., a spirally-configured portion) of a heating element may be disposed in series with a second portion (e.g., an elongate member portion) of a heating element. According to another aspect, the first portion of a heating element may be disposed in parallel with a second portion of the heating element. In yet another aspect, the spirally-configured portion 38 and the elongate member portion 39 may be separate heating element portions that may be configured to be controlled separately to provide heat to the heating cavity 40. As such, the spirally-configured portion 38 may be engaged to provide heat to the heating cavity 40 while the elongate member portion 39 may remain in a disengaged state. Alternatively, the elongate member portion 39 may be engaged to provide heat to the heating cavity 40 while the spirally-configured portion 38 may remain in a disengaged state. Further, the spirally-configured portion 38 may be controlled by a control unit to provide heat to the heating cavity 40 at a specific temperature, while the elongate member portion 39 may be controlled by the same or a different control unit to provide heat to the heating cavity at the same or a different temperature.

Aspects of the present disclosure advantageously provide for substantially thorough and even heating of the aerosol generating element by providing multiple heating elements, or a heating element having multiple portions, positioned within the tubular housing 30. Specifically, a smoking article according to one aspect includes a heating element 37 that includes a spirally-configured portion 38 that is disposed proximate to an outer wall 34 that provides heat to the outermost radial portions of the aerosol generating element 70, while an elongate member portion 39 provides heat to the innermost radial portions of the aerosol generating element. Accordingly, the heating element 37 may advantageously provide for heating of the aerosol generating element 70 radially inwardly from the outer wall 34 and for heating of the aerosol generating element radially outwardly from the inner wall 35 simultaneously.

According to some aspects, at least a portion of the heating element 37 may be disposed proximate to the wall member 41. In some aspects, the heating element 37 may include a heating element portion disposed proximate to the wall member 41 that operably connects the spirally-configured portion 38 to the elongate member portion 39. Accordingly, the heating element 37 may advantageously provide for heating of the aerosol generating element 70 longitudinally inward from the wall member 41 simultaneously with the heating of the aerosol generating element radially inwardly from the outer wall 34 and the heating of the aerosol generating element radially outwardly from the inner wall 35.

During production of the smoking article, an aerosol generating element 70 is inserted into the heating cavity 40 for eventual heating by the heating element 37. According to one aspect of the present disclosure, the aerosol generating element 70 may be a solid tobacco and/or tobacco-related material that is shaped and configured (i.e., a uniform hollow cylindrical shape) to be received within the heating cavity 40, as shown in FIG. 4A. In instances of a uniform hollow cylindrical configuration of the aerosol generating element 70, the aerosol generating element may be produced by a continuous process such as, for example, an extrusion process. In another aspect, the heating cavity 40 may be defined by a substantially cylindrical inner wall 35 and a tapered cylindrical outer wall 34 such that a corresponding aerosol generating element 70 may be shaped as a tapered hollow cylinder. As such, a surface 72 of the aerosol generating element 70 that engages the wall member 41 defined by the heating cavity 40 upon the aerosol generating element being inserted into the heating cavity 40, may have a smaller diameter than an opposing surface 71 of the aerosol generating element. While such a tapered configured may facilitate removal of an aerosol generating element from the heating cavity, the tapered configured may render the aerosol generating element unable to be formed by a continuous process (i.e., extrusion), wherein the aerosol generating element may then be produced as individual units in a discrete process such as, for example, by molding or casting.

As previously mentioned, the aerosol-generating material 70 may include solid tobacco and/or tobacco-related material, and may constructed as a hollow cylinder extrudate, as illustrated in FIG. 4A, comprising solid materials, such as tobacco, a tobacco component, or a tobacco-derived material (i.e., a material that is found naturally in tobacco that may be isolated directly from the tobacco or synthetically prepared). The tobacco that is employed can include, or can be derived from, tobaccos such as flue-cured tobacco, burley tobacco, Oriental tobacco, Maryland tobacco, dark tobacco, dark-fired tobacco and *Rustica* tobacco, as well as other rare or specialty tobaccos, or blends thereof. In another aspect, the aerosol-generating material 70 may include a solid tobacco and/or tobacco-related material and an additional flavoring agent and/or other material that alters the sensory or organoleptic character or nature of the mainstream aerosol of the smoking article. Such flavoring agents can be provided from sources other than tobacco and can be natural or artificial in nature. In some aspects, flavoring agents may be applied to, or incorporated within, the aerosol generating element 70 and/or those regions of the smoking article where an aerosol is generated (i.e., the heating cavity 40). Although flavoring agents may be directly applied to the aerosol-generating material 70 and/or heating cavity 40, in some aspects, a flavoring agent may be provided by a separate substrate that is disposed proximate to the aerosol-generating materials 70 and/or proximate to the heating cavity 40. Exemplary flavoring agents include vanillin, ethyl vanillin, cream, tea, coffee, fruit (e.g., apple, cherry, strawberry, peach and citrus flavors, including lime and lemon), maple, menthol, mint, peppermint, spearmint, wintergreen, nutmeg, clove, lavender, cardamom, ginger, honey, anise, sage, cinnamon, sandalwood, jasmine, cascarilla, cocoa, licorice, and flavorings and flavor packages of the type and character traditionally used for the flavoring of cigarette, cigar, and pipe tobaccos. Syrups, such as high fructose corn syrup, also can be employed. Flavoring agents also can include acidic or basic characteristics (e.g., organic acids, such as levulinic acid, succinic acid, and pyruvic acid).

Returning to FIGS. 4A-4D, the aerosol generating element 70 may define a longitudinal channel 73 extending from the surface 72 disposed proximate the wall member 41 when the aerosol generating element is inserted within the heating cavity 40 of the tubular housing 30 toward an opposing surface 71. The longitudinal channel 73 may be configured to receive therein at least a portion of the elongate member portion 39 of the heating element 37 therein. As illustrated in FIGS. 4A-4D, the aerosol generating element 70 may be defined by varying shapes. For example, according to one aspect, the inner wall 35 of the tubular housing may be tapered, with the outer wall 34 remaining substantially cylindrical, such that the surface 72 of the aerosol generating element 70 engaging the wall member 41 has a smaller cross-sectional area than the cross-sectional area of the opposing surface 71 of the aerosol generating element 70, as shown in FIG. 4C. As such, the inner surface 75 of the aerosol generating element 70 may be tapered in one longitudinal direction, while the outer surface 74 remains substantially cylindrical.

According to another aspect, the inner wall 35 of the tubular housing 30 may be substantially cylindrical in shape, while the outer wall 34 may be tapered, such that the surface 72 of the aerosol generating element 70 engaging the wall member 41 has a smaller cross-sectional area than the cross-sectional area of the opposing surface 71 of the aerosol generating element, as shown in FIG. 4B. Accordingly, the inner surface 75 of the aerosol generating element 70 may be substantially cylindrical in shape, while the outer surface 74 of the aerosol generating element may be tapered in one longitudinal direction.

In yet another aspect, both the outer wall 34 and the inner wall 35 of the heating cavity may be tapered in opposing longitudinal directions such that a corresponding aerosol generating element 70, as shown in FIG. 4D, includes a surface 72 having a smaller cross-sectional area than the cross-sectional area of the opposing surface 71 of the aerosol generating element 70. Further, as shown in FIG. 4D, the surface 72 may have a diameter smaller than the diameter of the opposing surface 71. Accordingly, when an appropriately shaped aerosol generating element 70 is inserted into a heating cavity defined by the tapered configuration of the outer wall 34 and the inner wall 35 in opposing longitudinal directions, the tapered configuration of the outer wall and inner wall facilitates removal of the aerosol generating element 70 from the heating cavity as the opposing tapered inner and outer walls provides for minimal resistance and/or contact with the aerosol generating element when removing the aerosol generating element from the heating cavity. Although the aerosol generating elements shown in FIGS. 4A-4D illustrate various shapes of generally hollow cylinders, other shapes are also envisioned by the present disclosure such as, for example, hollow cuboid, hollow parallelepiped, and/or the like.

FIGS. 10A-10C illustrate exemplary aerosol generating elements according to various aspects of the present disclosure. In particular, as shown in FIGS. 10A-10C, the aerosol generating element 70 may define a longitudinal channel 73 extending from the surface disposed proximate the wall member when the aerosol generating element is inserted within the heating cavity of the tubular housing toward an opposing surface 71. The longitudinal channel 73 may be configured to receive therein at least a portion of the second portion (e.g., elongate member portion) 39 of the heating element 37 therein. As illustrated in FIGS. 10A and 10C, the aerosol generating element 70 may be configured as a hollow cylinder extrudate. FIG. 10A illustrates an aerosol generating element 70 being configured as a hollow cylinder extrudate of a tobacco and/or tobacco-related material corresponding to and receivable by the hollow cylindrical cavity. FIG. 10C illustrates an aerosol generating element 70 being configured as a hollow cylinder extrudate of a plurality of microcapsules each containing a tobacco-related material and a binder to substantially form the plurality of microcapsules into a structure that corresponds to and is receivable by the hollow cylindrical cavity. FIG. 10B illustrates another aerosol generating element 70 according to one aspect where the aerosol generating element includes a reconstituted tobacco material that is formed into a sheet-like material, which is subsequently wound about the longitudinal channel 73 so as to define a substantially hollow cylindrical shape that corresponds to and is receivable by the hollow cylindrical cavity.

In other aspects, as shown in FIGS. 10D and 10E, the aerosol generating element may include at least one first portion 1071 that includes tobacco and/or tobacco-related materials (e.g., a blend of flavorful and aromatic tobaccos in cut filler form) and at least one second portion 1072 that includes a plurality of microcapsules each containing a tobacco related material (e.g., a tobacco-derived extract) dispersed within a binder configured to substantially maintain a hollow cylindrical structure that corresponds to and is receivable by the hollow cylindrical cavity. In one aspect, as illustrated in FIG. 10D, the aerosol generating element 70 may include a plurality of first portions 1071 and a plurality of second portions 1072 that are substantially arranged as respective wedge portions of the substantially hollow cylindrically shaped aerosol generating element 70. FIG. 10E illustrates another exemplary aspect of an aerosol generating element 70 that includes at least one first portion 1071 and at least one second portion 1072. In some aspects, the at least first portion 1071 may include tobacco and/or tobacco-related materials (e.g., a blend of flavorful and aromatic tobaccos in cut filler form) and the at least one second portion 1072 may include a plurality of microcapsules, each containing a tobacco related material (e.g., a tobacco-derived extract), dispersed within a binder configured to substantially maintain a hollow cylindrical structure that corresponds to and is receivable by the hollow cylindrical cavity. Additionally, in some aspects, the aerosol generating element 70, as shown in FIG. 10E, may be configured as a multi-segmented aerosol generating element wherein a first surface of the at least one first portion 1071 is disposed proximate an opposing surface of the at least one second portion 1072. That is, a first portion 1071 and a second portion 1072 of the aerosol generating element 70 may be disposed such that a first surface of the first portion substantially abuts a second surface of the second portion so as to form a "two-up" aerosol generating element. According to some aspects, an authentic aerosol generating element 70 may include an identifying component configured to identify the aerosol generating element as being an authentic and genuine aerosol generating element. For example, in one aspect, the identifying component may include a particularly shaped member defined by the aerosol generating element such that insertion of the aerosol generating element within the heating cavity 40 is accomplished and completed only when an aerosol generating element having the particularly shaped member is inserted within the heating cavity 40. For example, the surface 72 of the aerosol generating element 70 may define a depression disposed at a particular location. The wall member 41 defining the heating cavity 40 may also include a corresponding protrusion that is configured to engage, mate, and/or operably connect with the depression defined by the surface 72 of the aerosol generating element. As such, only authentic aerosol generating elements including the authenticating shaped member may be fully and completely inserted within the heating cavity. According to another aspect, the outer wall 34 and/or inner wall 35 may define a protrusion that extends longitudinally from the wall member 41 to the opposing end of the hollow cylinder. As such, an authentic aerosol generating element 70 may include a corresponding channel defined by outer surface 74 and/or inner surface 75 configured to engage, mate, and/or operably connect the authentic aerosol generating element with the longitudinal protrusion defined by the outer wall 34 and/or inner wall 35 defining the heating cavity. As such, any shaped features, members, protrusions, channels, and/or the like of the aerosol generating element may act as an authenticating measure for the smoking article in that only an authentic and appropriately shaped aerosol generating element may be used with a smoking article of the present disclosure. For example, the longitudinally extending protrusions defined by the outer wall and/or inner wall, the protrusion extending from the wall member 41, and/or any other suitably shaped physical member may be configured to communicate with a control unit configured to be actuatable in response to the operable engagement between the suitably shaped physical member and the correspondingly-shaped member and/or portion of the aerosol generating element such that the control unit may engage the power source with a heating element only when the suitably shaped physical member is in operable engagement with the correspondingly-shaped member and/or portion of the aerosol generating element.

In some aspects, the aerosol generating element 70 may further comprise an identifying component configured to electronically communicate with any one of the control units of the smoking article for authenticating the aerosol generating element as a genuine and authentic aerosol generating element. For example, the identifying component may include a conductive element configured to operably engage a circuit associated with any one of the control units of the smoking article. As such, when an aerosol generating element 70 that includes such a conductive identifying component is inserted within the heating cavity, a control unit of the smoking article may be configured to be actuatable in response to the operable engagement between the conductive element of the identifying component and the circuit associated with the control unit. In some aspects, a control unit configured to operably engage the power source with the heating element 37 may be further configured to provide electrical current flow to the heating element 37 only when an aerosol generating element that includes such a conductive identifying component is inserted within the heating cavity and is operably engaged with a circuit associated with the control unit. According to one aspect, the identification component may include a radio-frequency identification element configured to electronically communicate with any one of the control units of the smoking article. As such, the control unit may be configured to operably engage the power source with the heating element 37 to provide electrical current flow to the heating element only after the control unit has communicated, verified, and/or authenticated the aerosol generating element that has been inserted within the heating cavity 40 by way of the radio-frequency identification element associated therewith.

Of course, one skilled in the art will further appreciate that the disclosure herein may also be associated with corresponding methods. In one aspect, as shown in FIGS. 5 and 6, such a method may comprise a method of producing an electronic smoking article. Such a method may comprise engaging a component housing including a power source with a first end or a longitudinally-opposed second end of a tubular housing, which includes an outer wall that defines a cylindrical cavity (Block 501).

The method may also include inserting an aerosol generating element into the cylindrical cavity (Block 502). The aerosol generating element may be configured to produce an aerosol in response to heat. In some aspects, the method may further include engaging a heating element with the tubular housing such that a first portion of the heating element extends about the outer wall and a second portion extends within the cylindrical cavity. According to some aspects, the heating element may be configured to provide heat to the aerosol-generating element when the heating element is operably engaged with the power source, as described above herein.

According to some aspects, the first or second end of the tubular housing opposite from the first or second end configured to engage the component housing may be configured to engage the mouthpiece. In some aspects, the tubular housing may further include a wall member that extends laterally and radially inward from the outer wall. The wall member may be disposed proximate to the first or second end of the tubular housing configured to receive and/or operably engage the component housing. In one aspect, the method may include engaging the heating element with the tubular housing such that the second portion of the heating element extends through the wall member and into the cylindrical cavity.

Further, in some aspects, the tubular housing may include concentrically-aligned inner and outer walls. The concentrically-aligned inner wall may be disposed within the cylindrical cavity defined by the outer wall, and the inner and outer walls may define a hollow cylindrical cavity therebetween having longitudinally-opposed ends. Additionally or alternatively, the method may include inserting the aerosol-generating element into the hollow cylindrical cavity of the tubular housing.

According to another aspect, the wall member may define a central channel that is coaxially aligned with the cylindrical cavity. In one aspect, the method may include inserting the second portion of the heating element through the central channel and into the cylindrical cavity. As such, the outer wall of the tubular housing and the second portion of the heating element may define a hollow cylindrical cavity therebetween that is configured to receive the aerosol-generating element therein. Additionally or alternatively, the method may include inserting the aerosol-generating element into the hollow cylindrical cavity of the tubular housing defined by the outer wall and the second portion of the heating element.

Further, the wall member may define at least one orifice configured to receive air therethrough. In one aspect, the method may include engaging a component housing including a power source with a first end or a longitudinally-opposed second end of the tubular housing so as to fluidly connect at least one passageway defined by the component housing with at least one orifice defined by the wall member. In some aspects, the method may include engaging a biasing element with the outer wall or wall member such that the biasing element is arranged to bias the aerosol-generating element outwardly of the cylindrical cavity. In another aspect, the method may include engaging the biasing element with the inner wall, outer wall, or the wall member such that the biasing element is arranged to bias the aerosol-generating element outwardly of the hollow-cylindrical cavity.

According to another aspect, the aerosol generating element may be configured as a hollow cylinder that is configured to be inserted within the hollow cylindrical cavity. Additionally or alternatively, the aerosol generating element may be configured as a hollow cylinder extrudate of a tobacco and/or tobacco-related material corresponding to and receivable by the hollow cylindrical cavity. In some aspects, the method may include inserting the aerosol-generating element configured as a hollow cylinder extrudate of a tobacco and/or tobacco-related material corresponding to and receivable by the hollow cylindrical cavity, into the hollow cylindrical cavity.

According to some aspects, the method may further include identifying the aerosol-generating element as being an authentic aerosol-generating element. In one aspect, the smoking article may include a control unit, and the method may further include identifying the aerosol-generating element as being an authentic aerosol-generating element by engaging an identifying component of the authentic aerosol-generating element with the control unit of the smoking article. According to another aspect, the identifying component may include a conductive element, and the method may include engaging the conductive element of the identifying component of the authentic aerosol-generating element with a circuit associated with the control unit on receipt of the authentic aerosol-generating element within the cylindrical cavity. The control unit may be configured to be actuatable in response to operable engagement between the conductive element of the authentic aerosol-generating element and the circuit so, to operably engage the power source with a heating element arranged to provide heat to the authentic aerosol-generating element.

In another aspect, an identifying component of an authentic aerosol-generating element may include a first physical member configured to operably engage a complementarily-configured second physical member of the smoking article. In one aspect, the method may include engaging a first physical member of the identifying component with a complementarily-configured second physical member in communication with the control unit upon inserting the authentic aerosol-generating element within the cylindrical cavity. The control unit may be configured to be actuatable in response to operable engagement between the first physical member of the authentic aerosol-generating element and the complementarily-configured second physical member.

According to some aspects, the method may further include engaging a first end of a mouthpiece with the component housing or tubular housing. In some aspects, the mouthpiece may define a passageway that extends longitudinally from the first end to an opposing second end. According to another aspect, operably engagement of the first end of the mouthpiece with the component housing or tubular housing may provide for fluid communication between the passageway and the cylindrical cavity of the tubular housing and at least one orifice defined by the wall member. Additionally or alternatively, the method may include engaging a conductive element of the mouthpiece with the component housing or tubular housing. The conductive element may be configured to cooperate with the heating element so as to complete a heating element circuit. In some aspects, the method may further include engaging an actuation element with the smoking article. The actuation element may be arranged such that the power source is responsive to actuation of the actuation element so as to direct power to a heating element arranged to provide heat to the aerosol-generating element.

According to yet another aspect of the present disclosure, as shown in FIG. 6, a method may be provided for producing an aerosol generating element for a smoking article that includes extruding a tobacco and/or a tobacco-related material as a hollow cylinder adapted to be received by a heating element extending about an outer surface and within an inner surface of the hollow cylinder, the hollow cylinder being response to heat provided to the inner and outer surfaces thereof by the heating element to thereby produce an aerosol and/or any other inhalable substances (Block 601).

In another aspect, an aerosol generating element for a smoking article is provided. The aerosol generating element may include a hollow cylinder extrudate of a tobacco and/or tobacco-related material that is adapted to be received by a heating element extending about an outer surface and within an inner surface of the hollow cylinder, wherein the hollow cylinder extrudate is responsive to heat provided by the heating element to produce an aerosol.

Referring now to FIGS. 7-9C, a smoking article 5 according to the present disclosure generally can comprise a mouthpiece portion 710, a component housing 750 that is configured to receive a power source 755 therein (e.g., within a power source cavity 759), a tubular housing 730 defining a space (i.e., a heating cavity 740 or cylindrical cavity), and an end cap 780. According to some aspects, each of the mouthpiece portion 710, the component housing 750, the tubular housing 730, and the end cap 780 may further include additional components. The mouthpiece portion 710 may further define a mouth-engaging end 711 (i.e., the end upon which a consumer can draw to inhale aerosol from the article) and a component housing-engaging end 712 that is longitudinally opposed to the mouth-engaging end. The component housing 750 may define a mouthpiece-engaging or first end 751 and a tubular housing-engaging or second end 752, which is configured to operably engage a component-engaging end 731 of the tubular housing 730. Further, the mouthpiece-engaging end 751 of the component housing 750 may be longitudinally opposed to the tubular housing-engaging end 752 of the component housing. As shown in FIGS. 7-9C, the component-engaging end 731 of the tubular housing may be longitudinally opposed to a distal end 732 of the tubular housing. According to some aspects, the distal end 732 of the tubular housing may be configured to operably engage a first, tubular housing-engaging end 781 of an end cap. The illustrated article is provided as a smoking article device having multiple components, but any of the mouthpiece portion, tubular housing, component housing, and/or end cap may be integrally formed with any of the other portions. As will be evident from further disclosure herein, it may be preferable for aspects of the smoking article to be formed of three or more separate portions, and in some aspects, four or more separate portions, that are joined together, each containing separate components of the smoking article therein.

The smoking article 5 according to the disclosure can have an overall shape that may be defined as substantially tubular shaped or substantially cylindrically shaped. As illustrated in FIGS. 7-9C, the component housing 750, the tubular housing 730, and/or the end cap 780 may each have a substantially round cross-section; however, other cross-sectional shapes (e.g., oval, square, triangle, etc.) also are encompassed by the present disclosure. As shown in FIGS. 7-9C, the mouthpiece portion 710 may include a first portion 715 proximate to the mouth-engaging end 711 and a second portion 716 proximate the component housing-engaging end 712. While the second portion 716 of the mouthpiece portion 710 may be substantially tubular shaped or substantially cylindrically shaped, the mouthpiece portion may be tapered such that the substantially cylindrically shaped second portion 716 tapers to a first portion 715 having a substantially oval cross-sectional shape.

Like previous aspects of the present disclosure discussed herein, an outer shell of the mouthpiece portion 710, the component housing 750, the tubular housing 730, and/or the end cap 780 may all be formed of any material suitable for forming and maintaining an appropriate conformation, such as a substantially tubular shape, and for retaining therein, the suitable components of each of the mouthpiece portion, the component housing, the tubular housing, and/or the end cap. The outer shells may be formed of substantially the same material. In some aspects, the outer shells may be formed of a material (natural or synthetic) that is heat resistant so as to retain its structural integrity (e.g., the materials do not degrade in response to heat) at least at a temperature that is the heating temperature provided by the heating element, as described herein. In some aspects, a heat resistive polymer may be used. In other aspects, ceramic materials may be used. In particular aspects, the outer shells may be comprised of a stainless steel material and/or other metallic materials.

As shown in FIGS. 7-9C, the smoking article 5 may comprise a component housing 750 including a mouthpiece-engaging end 751 and a longitudinally opposed tubular housing-engaging end 752. In some aspects, the longitudinally opposed tubular housing-engaging end 752 may be further configured to operably engage at least one of a component-housing engaging end 731 of a tubular housing 730 and/or a component housing-engaging end 781 of an end cap 780. As illustrated in FIGS. 8A-8C and 9A-9C, the mouthpiece engaging end 751 of the component housing 750 defines a first engagement feature 754 on an inner surface of the component housing configured to engage and/or operably connect the component housing 750 to the mouthpiece 710 for use. In some aspects, the first engagement feature 754 may include a threaded surface configured for a screw-type engagement with a complementary engagement feature 717 (e.g., a complementary threaded surface configured to engage the threaded surface of the engagement feature 754) of the component housing 750.

In some aspects, the tubular housing-engaging end 752 of the component housing 750 may define a second engagement feature 757 on an inner surface of the component housing configured to engage and/or operably connect the component housing 750 to the tubular housing 730 for use.

In some aspects, the second engagement feature 757 may include a threaded surface configured for a screw-type engagement with a complementary engagement feature 736 (e.g., a complementary threaded surface configured to engage the threaded surface of the second engagement feature 757) of the tubular housing 730. In another aspect, the tubular-housing engaging end 752 of the component housing may define a third engagement feature 758 on the inner surface of the component housing configured to engage and/or operably connect the component housing 750 to an end cap 780 for use. In some aspects, the third engagement feature 758 may include a threaded surface configured for a screw-type engagement with a complementary engagement feature 782 (e.g., a complementary threaded surface configured to engage the threaded surface of the third engagement feature 758) of the end cap 780. According to some aspects, the second engagement feature 757 may define a circumferential perimeter that is smaller than a circumferential perimeter of the third engagement feature 758. Accordingly, the complementary engagement feature 736 of the tubular housing 730 is configured to operably engage the threaded surface of the second engagement feature 757 of the component housing 750, but is unable to operably engage the threaded surface of the third engagement feature 758 of the component housing due to the differential in circumferences of the respective second and third engagement features. Further, the complementary engagement feature 782 of the end cap 780 is shaped with a circumferential perimeter larger than the complementary engagement feature 736 of the tubular housing such that the complementary engagement feature 782 of the end cap is configured to operably engage the threaded surface of the third engagement feature 758 of the component housing, but would be unable to operably engage the smaller circumferential threaded surface of the second engagement feature 757 of the component housing 750. In another aspect, the respective first, second, and third engagement features 754, 757, 758 of the component housing 750 and the respective complementary engagement feature 717 of the mouthpiece portion 710, the complementary engagement feature 736 of the tubular housing 730, and the complementary engagement feature 782 of the end cap 780 may each define a press-fit engagement; however, other types of engagement features (e.g., magnets, snap-fit, etc.) also are encompassed by the present disclosure.

In some aspects, as shown in FIG. 9A, the component housing 750 may define at least one passageway 756 configured to fluidly connect and provide for fluid communication between the tubular housing 730 and the mouthpiece portion 710. Additionally or alternatively, the tubular housing 730 may include a wall member 741 that extends laterally and radially inward from the outer wall 734. The wall member 741 may be disposed proximate to the first or longitudinally opposed second ends of the tubular housing 730. In some aspects, the wall member 741 may be disposed proximate to the component housing-engaging end 731 of the tubular housing. The wall member 741 may define at least one passageway 742 therethrough configured to fluidly connect and provide for fluid communication between the heating cavity 740 and the at least one passageway 756 of the component housing 750. In addition, the wall member 741 may define a heating element channel 743 that extends from the component housing-engaging end 731 of the tubular housing 730 to the heating cavity 740. The heating element channel 743 may be configured to receive a second portion 745 of a heating element 737 therethrough, as described in greater detail herein. The at least one passageway 742 may further be configured to provide for fluid communication between at least one orifice 783 defined by the end cap 780, which may be configured to fluidly connect and communicate with the heating cavity 740, and the at least one passageway 756 of the component housing 750. Additionally or alternatively, the mouthpiece portion 710 may define at least one mouthpiece channel 714 configured to fluidly connect and communicate with the at least one passageway 756 defined by the component housing 750. As such, in response to a draw upon the mouth-engaging end 711 of the mouthpiece portion 710, air may, in turn, be drawn through the orifice 783, through the heating cavity 740, through the at least one passageway 742 defined by the wall member 741, through the at least one passageway 756 defined by the component housing 750, and through the mouthpiece channel 714 to the mouth-engaging end of the mouthpiece portion. As such, according to some aspects, the heating cavity 740 may be configured to release an aerosol (which can include any further inhalable substances included therewith) from the aerosol generating element 70, through the at least one passageway 742 defined by the wall member 741, through the at least one passageway 756 defined by the component housing, and through the mouthpiece channel 714 to the mouth-engaging end of the mouth piece portion, in response to the draw.

According to some aspects, the component housing 750 may further define a power source cavity 759 configured to receive a power source such as, for example, a battery 755 therein. Additionally, the component housing 750 may define a biasing element cavity 761, as shown in FIGS. 9B and 9C, configured to receive a second portion 745 of a heating element and/or a biasing element 760 associated therewith. As such, in one aspect, a second portion 745 of the heating element 737 may be configured to contact and/or communicate with a battery 755 disposed within the power source cavity 759 when the second portion 745 of the heating element is disposed within the biasing element cavity 761.

In some aspects, as shown in FIGS. 9B and 9C, the component housing 750 may further define a biasing element orifice 753 that extends from an external surface of the component housing to the biasing element cavity 761. Additionally, the biasing element orifice 753 is configured to receive an engagement portion 762 of the biasing element 760 therethrough. In particular, the engagement portion 762 extends radially from the biasing element 760 and is configured to extend through the biasing element orifice 753 defined by the component housing 750. In some aspects, the engagement portion 762 is further configured to extend radially through the biasing element orifice 753 and past the external surface of the component housing 750.

Additionally, the smoking article 5 can include one or more status indicators or other indicia positioned on any one or combination of the outer shells of the mouthpiece portion, component housing, and/or end cap. As shown in FIGS. 8A-8C and 9B-9C, for example, a status indicator 790 may be positioned on an outer shell of the component housing 750 and may be configured to provide indicators, as discussed above, corresponding to the number of puffs taken from or remaining within the article. Additionally or alternatively, the indicator 790 can provide additional indicators, such as, for example, an indication of an active or inactive status. In another aspect, the indicator 790 may be configured to light up in response to a puff, draw, and/or the like. According to one aspect, an indicator 790 may be disposed in association with the component housing 750 and may be configured to provide an indication of the amount of energy remaining within the battery 755 or other power source. The indicator 790 may include, for example, a liquid crystal display or LED display. The use of any number of indicators or other indicia is also encompassed by the present disclosure, and the indicators or other indicia can be associated with an opening in a shell, through which opening an audible alert may be emitted when appropriate.

According to some aspects of the present disclosure, the component housing 750 may further be configured to receive a power source, such as a battery 755, and may further include at least one electronic control unit (not shown), and these components can be placed in a variety of orders within the component housing 750. Although not expressly shown, it is understood that the smoking article 5, and the component housing 750 in particular, can include wiring or other conductor arrangements, as necessary, to provide electrical current from the battery 755 to the additional components and to interconnect the components for appropriate operation of the necessary functions provided by the smoking article 5. For example, the smoking article 5 may include wiring (not shown) within the component housing 50 and/or the tubular housing 730 as necessary to provide electrical current from the battery 755 of the component housing 750 to a heating element 737 located within the tubular housing 730. According to another aspect of the present disclosure, the smoking article may include wiring or other conductor arrangements (not shown) within the component housing 750 and/or tubular housing 730 as necessary to provide electrical current from the battery 755 of the component housing 750 to one or more status indicators and/or other indicia positioned on any one or combination of the outer shells of the mouthpiece portion 710, component housing 750, and/or end cap 780 and/or disposed within any of the mouthpiece portion, component housing, and/or end cap.

As illustrated in FIGS. 7-9C, the smoking article may include a mouthpiece portion 710 that includes a component housing-engaging end 712 configured to engage and/or operably connect the mouthpiece portion to the mouthpiece-engaging end 751 of the component housing 750. According to another aspect of the present disclosure, the mouthpiece-engaging end 751 of the component housing 750 may include an engagement feature configured to engage and/or operably connect the component housing to the mouthpiece portion 710. In some aspects, the engagement feature configured to engage and/or operably connect the component housing 750 to the mouthpiece portion 710 may include a snap-fit and/or press-fit type of engagement. In another aspect, the engagement feature 754 may implement a threaded engagement configured to engage and/or operably connect the component housing to a complementary engagement feature 717 of the mouthpiece portion 710.

In some aspects, the mouthpiece portion 710 may include a first portion 715 and a second portion 716. As shown in FIGS. 8A-9C, the mouthpiece portion 710 may include a first portion 715 proximate the mouth-engaging end 711 that has a substantially oval cross-sectional shape and a second portion 716 proximate the component housing-engaging end 712 that has a substantially circular cross-sectional shape. Further, as shown in FIGS. 8A-9C, the second portion 716 may taper towards the first portion 715 such that the substantially circular cross-sectional shape of the second portion may taper to the substantially oval cross-sectional shape of the first portion. Although the first portion 715 is illustrated as having a substantially oval cross-section and the second portion is illustrated as having a substantially circular cross-section, other cross-sectional shapes (e.g., square, rectangular, etc.) are also encompassed by the present disclosure. Additionally, FIGS. 8A-9C illustrate that the second portion 716 of the mouthpiece portion 710 has an outermost diameter substantially similar to the outermost diameter of the component housing 750. As such, when the mouthpiece portion 710 is operably engaged with the component housing 750, the engagement provides for a uniform transition between the mouthpiece portion and the component housing. Additionally, in some aspects, the mouthpiece portion 710 may include material that is substantially heat-resistant. In some aspects, the mouthpiece portion 710 may include a stainless steel material. According to some aspects, the heat generated by the heating element 737 within the heating cavity 740 may be sufficient to provide an aerosol from the aerosol generating element 70, while the mouthpiece portion 710 remains relatively cooler.

As shown in FIGS. 7-9C, the smoking article 5 may include a tubular housing 730 that includes a component housing-engaging end 731 and a longitudinally opposed distal end 732. The component housing-engaging end 731, according to one example aspect, defines a complementary engagement feature 736 that is configured to engage and/or operably connect the tubular housing 730 to the tubular housing-engaging end 752 of the component housing 750, as previously discussed herein.

According to some aspects of the present disclosure, the tubular housing 730 may include electrical conductors, as necessary, to complete an electrical circuit with the battery 755 and heating element 737. Further, the tubular housing 730 may include appropriate electrical conductors such that the electrical circuit is operable when the tubular housing 730 is operably connected to both the component housing 750 and the mouthpiece portion 710 (e.g., via an operably connection between the component housing 750 and the mouthpiece portion 710). In some instances, the electrical circuit may only be operable when the aerosol generating element 70 is present in the heating cavity 740 of the assembled article. In some aspects, the heating element 737 can be electrically connected to the battery 755 through appropriate wiring or appropriate electrical conductors extending between the terminals of the battery and the heating element to facility formation of an electrical circuit configured to selectively direct current flow to the heating element such as, for example, a resistive heating element. In one aspect, the second portion 745 of the heating element 737 can be electrically connected to the battery 755 through direct contact and/or appropriate wiring or appropriate electrical conductors extending between terminals of the battery and the heating element. Additionally or alternatively, the second portion 745 of the heating element 737 may be configured to electrically connect the battery 755 to a first portion 738 of a heating element through appropriate wiring and/or appropriate electrical conductors extending between the terminals of the battery and the second portion of the heating element when the second portion 745 of the heating element 737 is inserted through the heating element channel 743 and extending within the heating cavity 740 of the tubular housing 730. In some aspects, the smoking article 5 can include an electrical circuit wherein at least one control component associated with the electrical circuit delivers, controls, or otherwise modulates power thereto from the battery 755 for energizing the heating element 737 according to one or more defined algorithms. Such an electrical circuit can specifically incorporate a flow sensor (not shown) such that the article 5 is only actuated upon application of a draw (i.e., at times of use by the consumer exerting a draw on the mouthpiece portion 710). For example, the flow sensor may be configured to detect a puff by the consumer or draw on the article, which then sends a signal to actuate the control component to direct power from the battery 755 to the heating element 737, such that the heating element produces heat to be provided to the aerosol generating element 70 within the heating cavity 740. The aerosol generating element, in turn, produces and provides an aerosol, in response to the heat, wherein the aerosol is suitable for inhalation by the consumer. The control algorithm may, for example, call for power to the heating element 737 according to a defined cycle in order to maintain the heating element at a defined temperature. The control algorithm may also be programmed to automatically deactuate or discontinue power to the heating element 737 after a defined time lapse without detection of a puff or draw on the article.

As discussed previously herein, the article 5 can include a temperature sensor configured and arranged to provide feedback to the control component. Such a temperature sensor can be, for example, in direct contact with the first or second portions of the heating element 737 or disposed in association with the heating cavity 740 in proximity to the aerosol generating element 70 (i.e., such that the heating element can be controlled by the controller to maintain the heat in proximity to the aerosol generating element at a desired temperature for forming the aerosol). Additionally or alternatively, other temperature sensing means may be used, such as, for example, implementing logic control components to evaluate resistance through a resistive heating element and correlating such resistance with the temperature of the heating element 737.

As discussed herein, the smoking article 5 may include a heating element 737 configured to provide heat to a heating cavity 740 defined by and within the tubular housing 730. For example, the smoking article may include wiring (not shown) within the component housing 750, the tubular housing 730, and/or end cap 780 to provide electrical current to a heating element 737 such as, for example, a first portion of a resistive heating element located within the tubular housing and a second portion of a resistive heating element configured to be received within the tubular housing, that are configured to provide heat to the heating cavity 740 defined, at least in part, by a wall member 741 and an outer wall 734. In some aspects, the tubular housing 730 includes a first or outer wall 734 that is substantially cylindrical in shape. As illustrated in FIG. 9A-9C, the outer wall 734 and a heating element channel 743 may be aligned concentrically about a longitudinal axis. Although FIG. 9A-9C illustrates the heating cavity 740 having a substantially cylindrical shape defined by the outer wall 734, other suitable shapes (e.g., rectangular parallelepiped, etc.) are also encompassed by the present disclosure. According to some aspects, the outer wall 734 may include a heat-conducting material, suitable to provide heat within the heating cavity 740. For example, the outer wall 734 may comprise a stainless steel material and/or other metallic material suitable to provide heat within the heating cavity.

As previously mentioned, the outer wall 734 and the wall member 741 may, at least in part, define a substantially cylindrical cavity. The wall member 741 may be disposed proximate to a component housing-engaging end 731 of the tubular housing 730. In addition, the wall member 741 may define a heating element channel 743 that extends therethrough. According to some aspects, the heating element channel 743 may be configured to receive a second portion 745 of the heating element 737 therethrough.

According to some aspects of the present disclosure, the tubular housing 730 may further include a biasing element operably engaged with one of the outer wall 734 and/or wall member 741 of the heating cavity 740. According to another aspect of the present disclosure, as shown in FIGS. 8B, 8C, 9B and 9C, the smoking article 5 may include a biasing element 760 configured to extend through the heating element channel 743 and/or operably engage the aerosol generating element 70. Additionally, the biasing element 760 include an engagement portion 762 configured to extend through a biasing element orifice 753 when the biasing element is disposed within biasing element cavity 761 defined by the component housing 750. In some aspects, the biasing element 760 may further define a biasing element heating channel 763 configured to receive a second portion 745 of the heating element 737 therethrough. According to one aspect, as shown in FIGS. 8B and 9B, the biasing element 760 may include a biasing portion 764 that is substantially cylindrical or tubular in shape. In another aspect, as illustrated in FIGS. 8C and 9C, the biasing element 760 may include a biasing portion 764 that includes a plurality of prongs, extensions, and/or the like that extend longitudinally from a first end of the biasing element 760 to the second end of the biasing element.

In some aspects, the biasing element 760 may be configured to provide a biasing force for biasing the aerosol generating element 70 outwardly from the heating cavity 740 when the end cap 780 is disengaged from the component housing 750. In one aspect, a consumer may urge the biasing element 760 against the aerosol generating element by engaging the engagement portion 762 and sliding the engagement portion 762 from a first end of the biasing element orifice 753 to a longitudinally opposed second end of the biasing element orifice, thereby causing the biasing portion 764 to operably engage and/or urge the aerosol generating element 70 from the heating cavity 740.

According to another aspect, a biasing element may be operably engaged with the wall member 741 and may be configured to exert a biasing force against the aerosol generating element 70 longitudinally outward of the heating cavity 740. For example, the biasing element may include a spring element and/or any suitable means for exerting a biasing force against the aerosol generating element towards the distal end 732 of the tubular housing 730 and longitudinally outward of the heating cavity 740 when the end cap 780 is disengaged from the component housing 750.

As previously mentioned, the tubular housing 730 may include a heating element 737 configured to provide heat to the heating cavity 740. In some aspects, the heating element 737 may be configured to provide heat to the heating cavity 740 when powered by a power source, such as, for example, the battery 755. In some aspects, the heating element 737 may comprise a resistive heating element, though other types of heating elements (i.e., induction, microwave, etc.) may also be implemented, as necessary or desired. According to some aspects, the heating element may include a spirally-configured portion 38 and an elongate member portion 39, as shown in FIGS. 3A and 3B. In some aspects, the spirally-configured portion 38 may be operably connected to the elongate member portion 39.

Returning to FIG. 9A-9C, a first or spirally configured portion 738 may be configured to extend longitudinally about the outer wall 734 defining the heating cavity 740. A second or elongate member portion 745 may be configured to be received by the heating element channel 743, for example, in a friction fit. More particularly, the outer diameter of the second portion 745 may be smaller than the inner diameter of the heating element channel 743. As such, the heating element channel 743 may be configured to receive the second portion 745 of the heating element 737 therethrough, as mentioned previously. In some aspects, the second portion 745 may include, as necessary, electrical wiring (not shown) and/or appropriate electrical conductors to provide electrical current from the battery 755 of the component housing 50 to the second portion 745 of the heating element 737. Additionally or alternatively, the second portion 745 may be configured to electrically connect and/or communicate with the first portion 738 of the heating element 737 so as to provide for an electrical connection and/or electrical current between the battery 755 of the component housing 750 to the first portion of the heating element. In some aspects, the second portion 745 may include electrical wiring (not shown) and/or appropriate electrical conductors to provide electrical current from the second portion 745 of the heating element 737 to the first portion 738 of the heating element located within the tubular housing 730.

According to some aspects, the first portion 738 of the heating element 737 may include a helix or spirally-configured portion configured to extend longitudinally about the outer wall 734 defining the heating cavity 740. Additionally or alternatively, the second portion 745 of the heating element 737 may include an elongate member portion configured to extend longitudinally, and which elongate member portion may be configured to be received within the heating element channel 743 defined by the wall member 741 of the tubular housing 730. The second portion 745 of the heating element 737 may thus be configured to extend longitudinally along a central axis about which a spirally-configured first portion 738 of the heating element 737 rotates. In this manner, the heating element 737 may be configured to provide heat to the heating cavity 740 both laterally through the outer wall 734 and laterally via the second portion 745 when the second portion is operably engaged with and received by the heating element channel 743. According to some aspects, the elongate member second portion 745 of the heating element 737, rather than being provided as a rod-like member, may be configured in different manners as necessary or desired. For example, the elongate member second portion 745 may, in some instances, be provided as a spirally-wound or helix portion, as shown in FIG. 3B. Accordingly, one aspect of the present disclosure includes a heating element 737 having a spirally-configured first portion 738 that rotates about an axis and an elongate member second portion 745 that is provided as a spirally-wound or helix portion that also rotates about the same axis.

According to some aspects, the elongate member second portion 745 may be disposed within a housing, which may be integrally formed with the tubular housing 730. As such, a spirally-configured first portion 738 of the heating element 737 may be integrally formed with the elongate member second portion 745 to form a unitary heating element 737. In another aspect, the spirally-configured first portion 738 and the elongate member second portion 745 of the heating element 737 may be separate heating element portions, as shown in FIG. 9A-9C, which may also be configured to be controlled separately to provide heat to the heating cavity 740. As such, the spirally-configured first portion 738 may be engaged to provide heat to the heating cavity 740 while the elongate member second portion 745 may remain in a disengaged state. Alternatively, the elongate member second portion 745 may be engaged to provide heat to the heating cavity 740 while the spirally-configured first portion 738 may remain in a disengaged state. Further, the spirally-configured first portion 738 may be controlled by a control unit to provide heat to the heating cavity 740 at a specific temperature, while the elongate member second portion 745 may be controlled by the same or a different control unit to provide heat to the heating cavity at the same or a different temperature.

Aspects of the present disclosure thus advantageously provide for substantially thorough and even heating of the aerosol generating element by providing multiple heating elements, or a heating element having multiple portions, positioned within the tubular housing 730. Specifically, a smoking article according to one aspect includes a heating element 737 that includes a spirally-configured first portion 738 that is disposed proximate to an outer wall 34 that provides heat to the outermost radial portions of the aerosol generating element 70, while an elongate member second portion 745 provides heat to the innermost radial portions of the aerosol generating element. Accordingly, the heating element 737 may advantageously provide for heating of the aerosol generating element 70 radially inwardly from the outer wall 734 and for heating of the aerosol generating element radially outwardly from the second portion 745, simultaneously, even if the second portion 745 is disposed in its own housing.

During production of the smoking article, an aerosol generating element 70 is inserted into the heating cavity 740 for eventual heating by the heating element 737, as discussed previously herein. According to one aspect of the present disclosure, the aerosol generating element 70 may be a solid tobacco and/or tobacco-related material that is shaped and configured (i.e., a uniform hollow cylindrical shape) to be received within the heating cavity 740, as shown in FIG. 4A. In instances of a uniform hollow cylindrical configuration of the aerosol generating element 70, the aerosol generating element may be produced by a continuous process such as, for example, an extrusion process. In another aspect, the heating cavity 40 may be defined by a substantially cylindrical second portion housing 745 and a tapered cylindrical outer wall 734 such that a corresponding aerosol generating element 70 may be shaped as a tapered hollow cylinder. As such, a surface 72 of the aerosol generating element 70 that engages the wall member 741 defined by the heating cavity 740 upon the aerosol generating element being inserted into the heating cavity 740, may have a smaller diameter than an opposing surface 71 of the aerosol generating element, as shown in FIG. 4B. While such a tapered configured may facilitate removal of an aerosol generating element from the heating cavity, the tapered configured may render the aerosol generating element unable to be formed by a continuous process (i.e., extrusion), wherein the aerosol generating element may then be produced as individual units in a discrete process such as, for example, by molding or casting. In another aspect, at least a portion of the second portion housing 745 may be shaped as a tapered cylinder, while the outer wall 734 may be substantially cylindrical in shape. Accordingly, a corresponding aerosol generating element 70 may be shaped such that the surface 72 of the aerosol generating element engaging the wall member has a smaller cross-sectional area than the cross-sectional area of the opposing surface 71 of the aerosol generating element, as shown in FIG. 4C. In another aspect, both the outer wall 734 and at least a portion of the second portion housing 745 may be tapered in opposing longitudinal directions such that a corresponding aerosol generating element, as shown in FIG. 4D, includes a surface 72 having a smaller cross-sectional area than the cross-sectional area of the opposing surface 71 of the aerosol generating element 70. Additionally, the surface 72 may have a diameter smaller than the diameter of the opposing surface 71. Accordingly, when an appropriately shaped aerosol generating element 70 is inserted into a heating cavity defined by the tapered configuration of the outer wall 734 and the second housing portion 745 in opposing longitudinal directions, the tapered configuration of the outer wall and second housing portion facilitates removal of the aerosol generating element 70 from the heating cavity 740 as the opposing tapered inner wall and second housing portion provides for minimal resistance and/or contact with the aerosol generating element when removing the aerosol generating element from the heating cavity. Although the aerosol generating elements shown in FIGS. 4A-4D illustrate various shapes of generally hollow cylinders, other shapes are also envisioned by the present disclosure such as, for example, hollow cuboid, hollow parallelepiped, and/or the like. Additionally, the aerosol-generating material 70 may include solid tobacco and/or tobacco-related material, and may constructed as a hollow cylinder extrudate, as illustrated in FIG. 4A, comprising solid materials, such as tobacco, a tobacco component, or a tobacco-derived material (i.e., a material that is found naturally in tobacco that may be isolated directly from the tobacco or synthetically prepared), as discussed previously herein.

According to some aspects, an authentic aerosol generating element 70 may include an identifying component configured to identify the aerosol generating element as being an authentic and genuine aerosol generating element. For example, in one aspect, the identifying component may include a particularly shaped member defined by the aerosol generating element such that insertion of the aerosol generating element within the heating cavity 740 is accomplished and completed only when an aerosol generating element having the particularly shaped member is inserted within the heating cavity 740. For example, the surface 72 of the aerosol generating element 70 may define a depression disposed at a particular location. The wall member 741 defining the heating cavity 740 may also include a corresponding protrusion that is configured to engage, mate, and/or operably connect with the depression defined by the surface 72 of the aerosol generating element. As such, only authentic aerosol generating elements including the authenticating shaped member may be fully and completely inserted within the heating cavity. According to another aspect, the outer wall 734 and/or second housing portion 745 may define a protrusion that extends longitudinally from the wall member 741 to the opposing end of the hollow cylinder. As such, an authentic aerosol generating element 70 may include a corresponding channel defined by outer surface 74 and/or inner surface 75 configured to engage, mate, and/or operably connect the authentic aerosol generating element with the longitudinal protrusion defined by the outer wall 734 and/or second housing portion 745 defining the heating cavity. As such, any shaped features, members, protrusions, channels, and/or the like of the aerosol generating element may act as an authenticating measure for the smoking article in that only an authentic and appropriately shaped aerosol generating element may be used with a smoking article of the present disclosure. For example, the longitudinally extending protrusions defined by the outer wall 734 and/or second housing portion 745, the protrusion extending from the wall member 741, and/or any other suitably shaped physical member may be configured to communicate with a control unit configured to be actuatable in response to the operable engagement between the suitably shaped physical member and the correspondingly-shaped member and/or portion of the aerosol generating element such that the control unit may engage the power source with a heating element only when the suitably shaped physical member is in operable engagement with the correspondingly-shaped member and/or portion of the aerosol generating element. In some aspects, the aerosol generating element 70 may further comprise an identifying component configured to electronically communicate with any one of the control units of the smoking article for authenticating the aerosol generating element as a genuine and authentic aerosol generating element, as discussed previously herein.

According to one aspect, the disclosure may also be associated with corresponding methods such as, for example, a method of producing an electronic smoking article. Such a method may include inserting a power source such as, for example a battery 755, into a component housing 750 defining a power source cavity 759, as illustrated in FIG. 9A-9C, wherein the component housing defines a first end and a longitudinally-opposed second end. The component housing may include a mouthpiece-engaging end or first end and a longitudinally-opposed tubular housing-engaging end or second end. In some aspects, the first or second end may be a mouthpiece-engaging end. In another aspect, the first or second end may be a tubular housing-engaging end. Further, the tubular housing-engaging end of the component housing may be further configured to operably engage an end cap. The component housing may further include at least one passageway configured to fluidly connect and/or communicate with at least one of a mouthpiece channel, a passageway defined by the wall member of a tubular housing, a heating cavity, and/or at least one orifice defined by the end cap.

The method may also include engaging the heating element with the tubular housing. For example, the method may include engaging a second portion of a heating element with the tubular housing, such that a first portion of the heating element extends about the outer wall (e.g., outer wall 734) and a second portion (e.g., second portion 745) extends through a central channel (e.g., a heating element channel 743) and into the cylindrical cavity (e.g., heating cavity 740) of a tubular housing. The central channel may be disposed proximate a first end of a tubular housing. In some aspects, the tubular housing may have a first end and a longitudinally-opposed second end. Additionally or alternatively, the tubular housing may include an outer wall extending longitudinally therebetween. According to some aspects, the first end of the tubular housing may be configured to operably engage the first or second end of the component housing. In some aspects, the outer wall of the tubular housing and a second portion housing that includes the second portion of a heating element may define a longitudinally-extending hollow cylindrical cavity therebetween.

According to some aspects, the method may further include engaging the first end of the tubular housing with the first or second end of the component housing. In some aspects, the tubular housing may include a component housing-engaging end and a longitudinally-opposed distal end. According to one aspect, the component housing-engaging end of the tubular housing may be the first end of the tubular housing, while the longitudinally-opposed distal end of the tubular housing may be the second end of the tubular housing. According to some aspects, the component housing-engaging end of the tubular housing may be configured to operably engage a tubular housing-engaging end of the component housing. In some aspects, the component housing may include a first, second and third engagement feature disposed on an inner surface of the component housing. The second engagement feature of the component housing disposed proximate to the tubular housing-engaging end may be configured to engage and/or operably connect the component housing to the tubular housing via a complementary engagement feature disposed proximate to the component housing-engaging end of the tubular housing. According to some aspects, the second and engagement feature of the component housing may include a threaded surface configured to engage the complementary engagement feature of the tubular housing, which may also include a threaded surface.

Additionally, the method may include inserting an aerosol-generating element into the hollow cylindrical cavity. The aerosol-generating element may be configured to produce an aerosol in response to heat being provided thereto by the heating element. According to some aspects, a heating element with a first and second portion may be configured to provide heat to the heating cavity thereby causing the aerosol-generating element to produce an aerosol. More particularly, a first portion of a heating element within the tubular housing and a second portion of a heating element, which may be configured to be inserted within a heating element channel defined by the tubular housing, may be configured to provide heat to the hollow cylindrical cavity, as described above herein.

In some aspects, the aerosol generating element may be configured as a hollow cylinder that is configured to be inserted within the hollow cylindrical cavity. Additionally or alternatively, the aerosol generating element may be configured as a hollow cylinder extrudate of a tobacco and/or tobacco-related material. In some aspects, the aerosol generating element may include an identifying component that is configured to identify the aerosol generating element as being authentic. As such, according to some aspects of the present disclosure, the method may further include operably engaging a conductive element associated with the identifying component with a circuit associated with a control unit. Accordingly, insertion of the aerosol generating element into the hollow cylindrical cavity (i.e., the heating cavity 740) may cause the control unit, which may configured to be actuatable in response to operable engagement between the conductive element of the identifying component and the circuit, to actuate if the aerosol generating element is authentic. In some aspects, the control unit may be configured to operably engage the power source with a heating element, and the heating element may be arranged to provide heat to the aerosol generating element, when the conductive element is in operable engagement with the circuit. According to another aspect, the method may further include operably engaging an actuation element with the power source. The power source may be configured to respond to actuation of the actuation element so as to direct power to the heating element that may be arranged to provide heat to the aerosol generating element.

According to some aspects, the aerosol generating element may include an identifying component that is configured to identify the aerosol generating element as being authentic. For example, the aerosol generating element may further include a first physical member that is associated with the identifying component. A second complementary-configured physical member may be in communication with the control unit. As such, the method may include a control unit actuating upon insertion of the aerosol generating element within the hollow cylindrical cavity, and more specifically, upon the first physical member operably engaging the second complementary-configured physical member. According to some aspects, the control unit may be configured to operably engage the power source with a heating element, the heating element being arranged to provide heat to the aerosol generating element, when the first physical member operably engages the second complementary-configured physical member.

In some aspects, the method may further include engaging a heating element with the tubular housing. A first portion of the heating element of the heating element may be configured to extend about an outer wall of the tubular housing. In some aspects, a second portion of the heating element may be configured to extend within a second portion housing, which may be configured to be received by and operably engage the tubular housing. Additionally, the first and second portions of the heating element may be configured to cooperate, communicate, and/or engage the power source to provide heat to the aerosol generating element.

According to another aspect, the method may further include engaging a heating element with the tubular housing such that a spirally-configured portion of the heating element extends longitudinally along the outer wall. For example, a first portion of the heating element may be a spirally-configured portion that extends longitudinally along the outer wall of the tubular housing. In some aspects, the method may include engaging a heating element with the tubular housing such that an elongate member portion of the heating element (e.g., a second portion of the heating element) extends longitudinally and coaxially through a central channel such as, for example, a heating element channel defined by the wall member. The heating element channel may be arranged concentrically with respect to the outer wall of the tubular housing. As such, the elongate member second portion of the heating element may be configured to extend longitudinally and coaxially through the central channel and extend within the cylindrical cavity defined by the tubular housing. In yet another aspect, a second portion of the heating element may include a spirally-configured portion that extends longitudinally and coaxially through the central channel and extend within the cylindrical cavity defined by the tubular housing.

As previously mentioned, the component housing may include at least one passageway that extends longitudinally from a first end to a second end of the component housing. The passageway defined by the component housing may be configured to fluidly connect and/or communicate between the at least one orifice and/or passageway defined by the tubular housing and a mouthpiece channel defined by the mouthpiece portion. The mouthpiece channel may extend longitudinally from one end of the mouthpiece portion to a longitudinally-opposed second end. Additionally or alternatively, the method may further include operably engaging one longitudinal end of a mouthpiece portion with the first or second end of the component housing opposing other of the first and second ends of the component housing engaged with the tubular housing. For example, a component housing-engaging end of the mouthpiece portion may be configured to operably engage a mouthpiece-engaging end of the component housing, the mouthpiece-engaging end of the component housing being longitudinally opposed to the tubular housing-engaging end of the component housing. In some aspects, the method may include operably engaging the component housing-engaging end of the mouthpiece portion with the mouthpiece-engaging end of the component housing such that a conductive element associated with the mouthpiece portion cooperates with a first portion of a heating element associated with the tubular housing and/or a second portion of the heating element that extends within the cylindrical cavity to complete a heating element circuit when the mouthpiece portion and the component housing are in operable engagement. In another aspect, the conductive element associated with the mouthpiece portion may be configured to cooperate with the first portion of a heating element associated with the tubular housing and/or the second portion of the heating element configured to extend within the cylindrical cavity to complete a heating element circuit when both the mouthpiece portion is in operably engagement with the component housing and the tubular housing is in operable engagement with component housing.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

That which is claimed:

1. A smoking article, comprising:

a housing having a first end, a longitudinally-opposed second end, and an outer wall defining a heating cavity within the housing, the heating cavity configured to receive an aerosol-generating element therein via an opening in the first end;

a mouthpiece including a first end and a longitudinally opposed second end with a passageway extending longitudinally therebetween, wherein the first end is configured to engage with a user's mouth and the second end is configured to engage with the first end of the housing; and a heating element disposed within the heating cavity and including a helically-arranged first portion configured to at least partially surround the aerosol-generating element and a second portion including an elongate member configured to be received within the aerosol-generating element.

2. The smoking article of claim 1, wherein the housing further includes an inner wall concentrically aligned with the outer wall of the heating cavity to define an annular cavity therebetween and arranged to receive the aerosol-generating element.

3. The smoking article of claim 2, wherein the inner wall defines a central channel coaxially aligned with the heating cavity, the central channel being arranged to operably engage and receive the second portion of the heating element therethrough.

4. The smoking article of claim 1 further comprising an aerosol-generating element defining an outer surface and an inner surface concentrically aligned about a longitudinal axis of the aerosol-generating element, the aerosol-generating element being receivable within the heating cavity such that when received within the heating cavity, the outer surface of the aerosol-generating element is at least partially surrounded by the helically-arranged first portion and the second portion of the heating element extends within the inner surface of the aerosol-generating element.

5. The smoking article of claim 4, wherein the aerosol-generating element comprises a plurality of microcapsules containing a tobacco related material.

6. The smoking article of claim 4, wherein the aerosol-generating element includes an identifying component that identifies the aerosol-generating element as being authentic.

7. The smoking article of claim 1, wherein the heating element is selected from the group consisting of a resistive heating element, an induction heating element, or a microwave heating element.

8. The smoking article of claim 1 further comprising a power source configured to operably engage the heating element, wherein the first and second portions of the heating element are operably engaged with the power source and selectively operable therewith to selectively heat the aerosol-generating element.

9. The smoking article of claim 1, wherein the housing further comprises a biasing element at least partially disposed within the heating cavity and configured to at least partially eject the aerosol-generating element.

10. The smoking article of claim 9, wherein the mouthpiece is reusable and the second end of the mouthpiece is configured to extend within the housing such that the mouthpiece engages the aerosol-generating element so as to urge the aerosol-generating element against the biasing element.

11. The smoking article of claim 1 further comprising a sensor configured to detect a draw on the mouthpiece, and in response to detecting a draw, activate the heating element.

12. The smoking article of claim 11 further comprising a control component operably coupled to the sensor and configured to cause the heating element to receive electrical energy from the power source for a predetermined length of time.

13. A smoking article, comprising:

a housing having a first end, a longitudinally-opposed second end, and an outer wall defining a heating cavity within the housing, the heating cavity configured to receive an aerosol-generating element therein via an opening in the first end;

a reusable mouthpiece including a first end and a longitudinally opposed second end with a passageway extending longitudinally therebetween, wherein the first end is configured to engage with a user's mouth and the second end is configured to removably engage with the first end of the housing to enclose the aerosol-generating element therein;

a power source; and a heating element disposed within the heating cavity and comprising a helically-arranged portion configured to at least partially surround the aerosol-generating element when received within the heating cavity.

14. The smoking article of claim 13 further comprising an aerosol-generating element comprising:

a tobacco-related material; and an outer surface, wherein the aerosol-generating element is fully receivable within the heating cavity of the housing such that when received therein the heating element is electrically connected to the power source and configured to heat the aerosol-generating element to produce an aerosol.

15. The smoking article of claim 14, wherein the helically-arranged portion of the heating element is disposed about the outer surface of the aerosol-generating element and the heating element further comprises a second portion disposed within a channel defined by the aerosol-generating element, wherein the helically-arranged and second portions of the heating element are operably engaged with the power source and selectively operable therewith to provide heat.

16. The smoking article of claim 15, further comprising an actuation element, the power source being responsive to actuation of the actuation element to selectively direct power to at least one of the helically-arranged portion or the second portion of the heating element to selectively heat the aerosol-generating element.

17. The smoking article of claim 14, wherein the heating element is selected from the group consisting of a resistive heating element, an induction heating element, or a microwave heating element.

18. The smoking article of claim 14, wherein the aerosol-generating element comprises a plurality of microcapsules each containing the tobacco related material.

19. The smoking article of claim 14 further comprising a sensor configured to detect a draw on the mouthpiece, and in response to detecting a draw, activate the heating element.

20. The smoking article of claim 19 further comprising a control component operably coupled to the sensor and configured to cause the heating element to receive electrical energy from the power source for a predetermined length of time.

21. The smoking article of claim 14, wherein the aerosol-generating element includes an identifying component that identifies the aerosol-generating element as being authentic.

22. The smoking article of claim 13 further comprising an aerosol-generating element comprising:

a tobacco-related material; and an inner surface defining a longitudinal channel, wherein the aerosol-generating element is fully receivable within the heating cavity of the housing such that when received therein the heating element is electrically connected to the power source and configured to heat the aerosol-generating element to produce an aerosol.

23. The smoking article of claim 13, wherein the housing further comprises a biasing element at least partially disposed within the heating cavity and configured to at least partially eject the aerosol-generating element.

24. The smoking article of claim 23, wherein the mouthpiece is reusable and the second end of the mouthpiece is configured to extend within the housing such that the mouthpiece engages the aerosol-generating element so as to urge the aerosol-generating element against the biasing element.

25. A smoking article comprising:

a housing having a first end, a longitudinally-opposed second end, and an outer wall defining a heating cavity within the housing, the heating cavity configured to receive an aerosol-generating element therein via an opening in the first end;

a reusable mouthpiece including a first end and a longitudinally opposed second end with a passageway extending longitudinally therebetween, wherein the first end is configured to engage with a user's mouth and the second end is configured to removably engage with the first end of the housing to enclose the aerosol-generating element therein;

a power source;

an aerosol-generating element comprising:

a tobacco-related material; and an outer surface; and a heating element helically-arranged about the outer surface of the aerosol-generating element, wherein the aerosol-generating element is fully receivable within the heating cavity of the housing such that when received therein the heating element is electrically connected to the power source and configured to heat the aerosol-generating element to produce an aerosol.

26. The smoking article of claim 25, wherein the aerosol-generating element further comprising:

an inner surface defining a longitudinal channel; and an elongate second portion of the heating element extends within the longitudinal channel, wherein the aerosol-generating element is fully receivable within the heating cavity of the housing such that when received therein the helically-arranged portion and the second portion of the heating element are electrically connected to the power source and configured to heat the aerosol-generating element to produce an aerosol.

27. The smoking article of claim 25, wherein the heating element is selected from the group consisting of a resistive heating element, an induction heating element, or a microwave heating element.

28. The smoking article of claim 25, wherein the aerosol-generating element comprises a plurality of microcapsules each containing the tobacco related material.

29. The smoking article of claim 25, wherein the housing further comprises a biasing element at least partially disposed within the heating cavity and configured to at least partially eject the aerosol-generating element.

30. The smoking article of claim 25 further comprising a sensor configured to detect a draw on the mouthpiece, and in response to detecting a draw, activate the heating element.

31. The smoking article of claim 25 further comprising a control component operably coupled to the sensor and configured to cause the heating element to receive electrical energy from the power source for a predetermined length of time.

32. The smoking article of claim 25, wherein the helically-arranged portion of the heating element is disposed about the outer surface of the aerosol-generating element and the heating element further comprises a second portion disposed within a channel defined by the aerosol-generating element, wherein the helically-arranged and second portions of the heating element are operably engaged with the power source and selectively operable therewith to provide heat.

33. The smoking article of claim 32, further comprising an actuation element, the power source being responsive to actuation of the actuation element to selectively direct power to at least one of the helically-arranged portion or the second portion of the heating element to selectively heat the aerosol-generating element.

* * * * *